(12) United States Patent
Northrup et al.

(10) Patent No.: US 9,235,337 B2
(45) Date of Patent: Jan. 12, 2016

(54) SYSTEM, GUI AND METHOD FOR EDITING STEP AND REPEAT OPERATION INSTRUCTIONS IN A MACHINE VISION INSPECTION SYSTEM

(71) Applicant: Mitutoyo Corporation, Kanagawa-ken (JP)

(72) Inventors: Ryan Northrup, Renton, WA (US); Barry Saylor, Kent, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 372 days.

(21) Appl. No.: 13/891,106

(22) Filed: May 9, 2013

(65) Prior Publication Data

US 2014/0337780 A1    Nov. 13, 2014

(51) Int. Cl.
G06F 9/44 (2006.01)
G06F 3/0484 (2013.01)
G05B 19/409 (2006.01)
H04N 7/18 (2006.01)

(52) U.S. Cl.
CPC .......... *G06F 3/04847* (2013.01); *G05B 19/409* (2013.01); *H04N 7/18* (2013.01); *G05B 2219/35208* (2013.01); *G05B 2219/36018* (2013.01); *G05B 2219/37208* (2013.01)

(58) Field of Classification Search
USPC .......................................................... 717/109
See application file for complete search history.

(56) References Cited

U.S. PATENT DOCUMENTS 5,023,800 A  6/1991 Carver et al.
5,121,498 A  6/1992 Gilbert et al.
5,265,253 A  11/1993 Yamada
5,797,013 A  8/1998 Mahadevan et al.
6,026,240 A  2/2000 Subramanian
(Continued)

FOREIGN PATENT DOCUMENTS

DE   4 437 057 A1   4/1996
WO   95/07504 A1   3/1995
WO   00/67086 A1   11/2000

OTHER PUBLICATIONS

Extended European Search Report, dated Sep. 26, 2014, for European Patent Application No. 14167361.6, 7 pages.
(Continued)

*Primary Examiner* — Marina Lee
(74) *Attorney, Agent, or Firm* — Seed IP Law Group PLLC

(57) ABSTRACT

A system, a GUI and a method are provided that allow intuitive, flexible and robust editing of individually editable instructions generated by conversion operations applied to a defined step-and-repeat programming element in a machine vision inspection system. The method includes: a) Converting a defined step-and-repeat programming element to generate N independently-editable code blocks including an independently-editable substantial replication of a repeated operation block of the step-and-repeat element, each of code blocks executed at a respective location corresponding to a step and repeat location; b) Representing the code blocks in an editing GUI; and c) Eliminating the defined step-and-repeat programming element as an editable element. The defined step-and-repeat programming element may be represented in the editing GUI. The conversion operations may be initiated by a user activating a step and repeat conversion command directed to the defined step-and-repeat programming element.

17 Claims, 31 Drawing Sheets

(56) References Cited

U.S. PATENT DOCUMENTS

| | | | |
|---|---|---|---|
| 6,035,125 A | 3/2000 | Nguyen et al. | |
| 6,542,180 B1 | 4/2003 | Wasserman et al. | |
| 7,316,009 B2 * | 1/2008 | Peck | 717/138 |
| 7,324,682 B2 | 1/2008 | Wasserman | |
| 7,454,053 B2 | 11/2008 | Bryll et al. | |
| 8,111,905 B2 | 2/2012 | Campbell | |
| 8,111,938 B2 | 2/2012 | Bryll et al. | |
| 8,271,895 B2 * | 9/2012 | Tseo | G05B 19/409 382/141 |
| 8,689,127 B1 * | 4/2014 | Ding | G01N 21/8851 715/771 |
| 8,902,307 B2 * | 12/2014 | Delaney | G05B 19/401 348/86 |
| 8,957,960 B2 * | 2/2015 | Saylor | G06F 8/30 348/135 |
| 9,013,574 B2 * | 4/2015 | Saylor | G05B 19/4093 348/86 |
| 2009/0088999 A1 * | 4/2009 | Bryll | G01B 21/045 702/86 |
| 2011/0231787 A1 * | 9/2011 | Tseo et al. | 715/771 |
| 2013/0123945 A1 * | 5/2013 | Saylor | G06F 8/30 700/17 |
| 2013/0125044 A1 * | 5/2013 | Saylor | G05B 19/4093 715/785 |
| 2014/0337775 A1 * | 11/2014 | Northrup | G06F 8/34 715/770 |
| 2014/0337780 A1 * | 11/2014 | Northrup et al. | 715/771 |
| 2015/0103156 A1 * | 4/2015 | Northrup et al. | 348/79 |

OTHER PUBLICATIONS

Gu et al., "Generative Inspection Process and Probe Path Planning for Coordinate Measuring Machines," Journal of Manufacturing Systems 15(4):240-255, 1996.

"QVPak 3D CNC Vision Measuring Machine User's Guide," published Jan. 2003, 330 pages.

"QVPAK 3D CNC Vision Measuring Machine Operation Guide," published Sep. 1996, 86 pages.

U.S. Appl. No. 13/297,232, filed Nov. 15, 2011, entitled "Machine Vision System Program Editing Environment Including Real Time Context Generation Features," 67 pages.

U.S. Appl. No. 13/676,061, filed Nov. 13, 2012, entitled "Machine Vision System Program Editing Environment Including Synchronized User Interface Features," 70 pages.

* cited by examiner

```
                                    ┌─512
                  ┌────────────────────────────────────────────┐
                  │ Search Options:          ▼   🔍 🔒          │
                  │   Min (ST) =                   0.0052526  ▲│
                  │   Max (ST) =                   0.0293015   │
                  │                                            │
                  │ Circle: Circle-5[2,2](ID:11, From 18 Pts.) │
                  │   Coord. X =           3.1669936           │
                  │   Coord. Y =           3.1767869           │
                  │   Coord. Z =          -0.0013000           │
                  │   Diameter =           0.6041322           │
                  │     Radius =           0.3020661           │
                  │   Circular. =                  0.0043367   │
                  │                                            │
                  │ Line: Line-3[2,2](ID:12, From 6 Pts.)      │
       [2,2] ⎰    │   Coord. X =           3.2449550           │
                  │   Coord. Y =           3.4493448           │
                  │   Coord. Z =          -0.0013000           │
                  │   Angle (XY) =       340.6240              │
                  │     X-Angle =         19.3760              │
                  │     Y-Angle =        109.3760              │
                  │     Z-Angle =         90.0000              │
                  │   Straight. =                  0.0567870   │
                  │   Min (ST) =                   0.0069936   │
                  │   Max (ST) =                   0.0283935   │
                  │                                            │
                  │ Circle: Circle-5[2,3](ID:13, From 18 Pts.) │
                  │   Coord. X =           3.1651753           │
                  │   Coord. Y =           4.7637736           │
                  │   Coord. Z =          -0.0013000           │
                  │   Diameter =           0.6062947           │
                  │     Radius =           0.3031474           │
                  │   Circular. =                  0.0040821   │
                  │                                            │
                  │ Line: Line-3[2,3](ID:14, From 6 Pts.)      │
       [2,3] ⎰    │   Coord. X =           3.2449867           │
                  │   Coord. Y =           5.0383161           │
                  │   Coord. Z =          -0.0013000           │
                  │   Angle (XY) =       339.9133              │
                  │     X-Angle =         20.0867              │
                  │     Y-Angle =        110.0867              │
                  │     Z-Angle =         90.0000              │
                  │   Straight. =                  0.0598168   │
                  │   Min (ST) =                   0.0078839   │
                  │   Max (ST) =                   0.0299084  ▼│
                  └────────────────────────────────────────────┘
```

```xml
<?xml version="1.0" encoding="UTF-8" standalone="yes"?>
-<MIML xmlns="urn:MEI-MIML" schemaVersion="10.1" protectType="0" modificationTag="59232" >
  -<Main>
    +<Prologue breakpoint="FALSE" nodeID="{272DEB91-CD2A-4D52-98FF-30207E453CEE}" returnCode="MIML_OK" blockMarker="FALSE" simulationStatus="good">
    +<Lightsset breakpoint="FALSE" nodeID="{F406A396-3354-4810-909B-ACFB16BD51D5}" returnCode="MIML_OK" blockMarker="FALSE" simulationStatus="good">
    +<StageMoveTo breakpoint="FALSE" nodeID="{110CBEA8-DC8D-40A8-8DFD-925A7B7BED F8}" returnCode="MIML_OK" blockMarker="FALSE" simulationStatus="good">
    +<Measure breakpoint="FALSE" nodeID="{4649691E-16F5-4320-840E-0F1399E88AB3}" returnCode="MIML_OK" blockMarker="FALSE" simulationStatus="good">
    +<FcsAlignOrigin breakpoint="FALSE" nodeID="{C61990DA-B812-44C5-8E64-F7B178A0D8C1}" returnCode="MIML_OK" blockMarker="FALSE" simulationStatus="good">
    +<Measure breakpoint="FALSE" nodeID="{BDE1FE3D-47EC-4707-99F4-05DC2E509D34}" returnCode="MIML_OK" blockMarker="FALSE" simulationStatus="good">
    +<FcsAlignAxis breakpoint="FALSE" nodeID="{1321F2AF-ED6D-432B-9D8B-C3A1191F9CA1}" returnCode="MIML_OK" blockMarker="FALSE" simulationStatus="good">
    E<StepArray breakpoint="FALSE" nodeID="{361F9795-35DD-441D-8C58-58FD79CC39C3}" returnCode="MIML_OK" iterations="6" blockMarker="FALSE" simulationStatus="good">
      <loopName>MyLoop</loopName>
      <exceptions>@</exceptions>
      <outerLoopIterations>2</outerLoopIterations>
      <outerLoopBetweenParts>FALSE</outerLoopBetweenParts>
      <outerLoopDX>1.587500000</outerLoopDX>
      <outerLoopDY>0.000000000</outerLoopDY>
      <outerLoopDZ>0.000000000</outerLoopDZ>
      <innerLoopIterations>3</innerLoopIterations>
      <innerLoopBetweenParts>FALSE</innerLoopBetweenParts>
      <innerLoopDX>0.000000000</innerLoopDX>
      <innerLoopDY>1.587500000</innerLoopDY>
      <innerLoopDZ>0.000000000</innerLoopDZ>
```

```
From Fig. 6A-1

355M ─────▶ ☐<Measure breakpoint="FALSE" nodeID="{CB925F3F-D2F5-4A14-A57F-7B0121DBB993}" returnCode="MIML_OK" blockMarker="FALSE"
355X ────── simulationStatus="good">
        +<ImageSetContext breakpoint="FALSE" nodeID="{2804F640-4545-49B7-A620-D5670FD390A7}" returnCode="MIML_OK"
blockMarker="FALSE" simulationStatus="good"/>
        +<CircleTool breakpoint="FALSE" nodeID="{CDF7F844-1698-4A88-836E-372385BE0364}" returnCode="MIML_OK" blockMarker="FALSE"
simulationStatus="good"/>
        +<DefineCircle breakpoint="FALSE" nodeID="{83145B84-61DD-47EE-A369-833AE533BD26}" returnCode="MIML_OK"
blockMarker="FALSE" simulationStatus="good"/>
        </Measure>
356M ─────▶ ☐<Measure breakpoint="FALSE" nodeID="{3339D6954-3082-43A1-BC46-B04EA4C713911}" returnCode="MIML_OK" blockMarker="FALSE"
356X ────── simulationStatus="good">
        +<BoxTool breakpoint="FALSE" nodeID="{F800701A-1059-4F0E-A1FB-4787B9A1558F}" returnCode="MIML_OK" blockMarker="FALSE"
simulationStatus="good"/>
        +<PointTool breakpoint="FALSE" nodeID="{CDF0CBD6-7959-4E18-AA00-F7A1A045F4CC}" returnCode="MIML_OK" blockMarker="FALSE"
simulationStatus="good"/>
        +<PointTool breakpoint="FALSE" nodeID="{A571B7B9-D02F-4584-AF5C-1C0FA2102881}" returnCode="MIML_OK" blockMarker="FALSE"
simulationStatus="good"/>
        +<DefineLine breakpoint="FALSE" nodeID="{2C3B47FC-D19F-445A-A44F-5AA6E1F3BC00}" returnCode="MIML_OK" blockMarker="FALSE"
simulationStatus="good"/>
        </Measure>
        <EndLoop breakpoint="FALSE" nodeID="{38192567-69EA-43A6-BD68-CEDEBD603C09}" returnCode="MIML_OK" blockMarker="FALSE"
357 ─────▶ simulationStatus="good"/>
        </StepArray>
        <EndPartProgram breakpoint="FALSE" nodeID="{84503602-67D7-48D6-B50A-7619832840660}" returnCode="MIML_OK"
blockMarker="FALSE" simulationStatus="good"/>
        </Main>
        </MIMl>
```

```xml
<?xml version="1.0" encoding="UTF-8" standalone="yes"?>
<MIML xmlns="urn:MEI-MIML" schemaVersion="10.1" protectType="0" modificationTag="59232" >
  <Main>
    +<Prologue breakpoint="FALSE" nodeID="{272DEB91-0D2A-4D52-9EFF-30207E453CEE}" returnCode="MIML_OK" blockMarker="FALSE" simulationStatus="good">
    +<LightSet breakpoint="FALSE" nodeID="{F406A396-3354-4810-909B-ACFB168D51D5}" returnCode="MIML_OK" blockMarker="FALSE" simulationStatus="good">
    +<StageMoveTo breakpoint="FALSE" nodeID="{110DEE48-DC8D-40AA-8DFD-925A7B7BE0F8}" returnCode="MIML_OK" blockMarker="FALSE" simulationStatus="good">
351M  +<Measure breakpoint="FALSE" nodeID="{46496916-16F6-4320-840B-DF1399E68AE3}" returnCode="MIML_OK" blockMarker="FALSE" simulationStatus="good">
352M  +<PcsAlignOrigin breakpoint="FALSE" nodeID="{C6190D0A-8812-44C5-8F64-F78178ADD8C1}" returnCode="MIML_OK" blockMarker="FALSE" simulationStatus="good">
353M  +<Measure breakpoint="FALSE" nodeID="{BD21F63D-47EC-47D7-99F4-05DC2E569D34}" returnCode="MIML_OK" blockMarker="FALSE" simulationStatus="good">
      +<PcsAlignAxis breakpoint="FALSE" nodeID="{1321F2AF-BD6D-4326-9D8B-C3A1191F9CA1}" returnCode="MIML_OK" blockMarker="FALSE" simulationStatus="good">
355[1,1]M  +<Measure breakpoint="FALSE" nodeID="{CB9252F-D2F5-4A14-A57F-7B0121DB6993}" returnCode="MIML_OK" blockMarker="FALSE" simulationStatus="questionable">
356[1,1]M  +<Measure breakpoint="FALSE" nodeID="{33D06954-3082-43A1-BC46-B084A4C73391}" returnCode="MIML_OK" blockMarker="FALSE" simulationStatus="questionable">
355[1,2]M  +<Measure breakpoint="FALSE" nodeID="{1B9368D6-57A2-457D-9361-6F41865ACDB7}" returnCode="MIML_OK" blockMarker="FALSE" simulationStatus="questionable">
356[1,2]M  +<Measure breakpoint="FALSE" nodeID="{0AB4BCD4-3081-4AA5-981D-5DF6EA55B469}" returnCode="MIML_OK" blockMarker="FALSE" simulationStatus="questionable">
355[1,3]M  +<Measure breakpoint="FALSE" nodeID="{08108C88-ACD4-488A-ACF9-BF1CA8D3A A59}" returnCode="MIML_OK" blockMarker="FALSE" simulationStatus="questionable">
356[1,3]M  +<Measure breakpoint="FALSE" nodeID="{F15B3F75-A9C5-4CAA-B695-AA86A5A059E7}" returnCode="MIML_OK" blockMarker="FALSE" simulationStatus="questionable">
355[2,1]M  +<Measure breakpoint="FALSE" nodeID="{74490225-B3D1-4E74-A925-767B50ACF58E}" returnCode="MIML_OK" blockMarker="FALSE" simulationStatus="questionable">
356[2,1]M  +<Measure breakpoint="FALSE" nodeID="{797D0924D-6E79-4D08-BD3D-18C2B4775E24}" returnCode="MIML_OK" blockMarker="FALSE" simulationStatus="questionable">
355[2,2]M  +<Measure breakpoint="FALSE" nodeID="{C5721E1F-B004-439D-93A7-092BB417B066}" returnCode="MIML_OK" blockMarker="FALSE" simulationStatus="questionable">
356[2,2]M  +<Measure breakpoint="FALSE" nodeID="{CE4C2A6D-5E2F-47D3-AA36-D685A167C05D}" returnCode="MIML_OK" blockMarker="FALSE" simulationStatus="questionable">
355[2,3]M  +<Measure breakpoint="FALSE" nodeID="{CA77B2F6-99F2-426F-8C28-BCF8A9707198}" returnCode="MIML_OK" blockMarker="FALSE" simulationStatus="questionable">
356[2,3]M  +<EndPartProgram breakpoint="FALSE" nodeID="{84503602-6707-48D6-B50A-761083284060}" returnCode="MIML_OK" blockMarker="FALSE" simulationStatus="questionable"/>
  </Main>
</MIML>
```

*Fig. 6B.*

```
                                              ┌─355[2,2]M (As Edited)
                                             ↙
-<Measure breakpoint="FALSE" nodeID="{C5721E1F-B004-439D-93A7-092BB417B066}"
returnCode="MIML_OK" blockMarker="FALSE" simulationStatus="questionable">
  -<ImageSetContext breakpoint="FALSE" nodeID="{5715AE6E-9D6D-4EAC-B12C-5AA217B8A785}"
returnCode="MIML_OK" blockMarker="FALSE" simulationStatus="questionable">
      <x>3.173545750</x>
      <y>3.173699332</y>
      <z>-0.001200000</z>
      ┌──────────────┐
      │<coax>15</coax>│         610A
      │<stage>0</stage>│────────
      └──────────────┘
      <ringFront>0</ringFront>
      <ringBack>0</ringBack>
      <ringRight>0</ringRight>
      <ringLeft>0</ringLeft>
      <mirrorLevel>0</mirrorLevel>
      <color>WHITE</color>
      <magnification>5.000000000</magnification>                    611A
  </ImageSetContext>                                                 ╲
  +<ImageSetContext breakpoint="FALSE" nodeID="{A4B8DA86-2719-496B-91E1-A4D08D8080BE}"
  returnCode="MIML_OK" blockMarker="FALSE" simulationStatus="questionable">
  ┌─────────────────────────────────────────────────────────────────────────────┐
  │-<SurfaceFocusWithPoint breakpoint="FALSE" nodeID="{D0D495B1-C0D1-40EE-A294-E51866626A5D}"│
  │returnCode="MIML_OK" blockMarker="FALSE" simulationStatus="questionable">    │
  │    <searchType>MEDIUM</searchType>                                          │
  │    <searchRange>0.508438670</searchRange>                                   │
  │    <function>STANDARD</function>                                            │
  │    <vcs>FALSE</vcs>                                                         │
  │    <x>2.712771195</x>                                                       │
  │    <y>2.872073193</y>                                                       │
  │    <z>0.005800000</z>                                                       │
  │    <w>0.288120000</w>                                                       │
  │    <h>0.217560000</h>                                                       │
  │    <angle>-0.014159457</angle>                                              │
  │    +<simulationData>                                                        │
  │  </SurfaceFocusWithPoint>                                                   │
  └─────────────────────────────────────────────────────────────────────────────┘
  +<CircleTool breakpoint="FALSE" nodeID="{08AB5F61-0B8D-499C-802B-C206E484757E}"
  returnCode="MIML_OK" blockMarker="FALSE" simulationStatus="questionable">
      <vcs>FALSE</vcs>
      <x>3.173440906</x>
      <y>3.154099357</y>
      <z>0.002800000</z>
      <r1>0.227360000</r1>
      <r2>0.421400000</r2>
      <outlier>0.000000000</outlier>
      <th>46.457142857</th>
      <thr>0.191941392</thr>
      <ths>11.500000000</ths>
      <alg>DYNAMIC_THRESH</alg>
      ┌────────────────────────────────┐
      │<edgeSlope>FALLING</edgeSlope>  │────  612A
      └────────────────────────────────┘
      <edgeQuality>STRONG</edgeQuality>
      <filterType>@</filterType>
      <dllName>@</dllName>
      <paramList>@</paramList>
      <scanInterval>20</scanInterval>
      <scanIntervalUnits>DEGREES</scanIntervalUnits>
      <samplingDirection>CLOCKWISE</samplingDirection>
      +<simulationData>
  </CircleTool>
              ╭─────────────╮
              │ To Fig. 6C-2 │
              ╰─────────────╯
                    ↓
```

*Fig. 6C-1.*

*355[2,2]M (As Edited)*

*From Fig. 6C-1*

```
-<DefineCircle breakpoint="FALSE" nodeID="{AD503B19-043D-40BB-B5CC-BE1E9EC203FC}"
returnCode="MIML_OK" blockMarker="FALSE" simulationStatus="questionable">
    <featureLabel>Circle-5-SPECIAL</featureLabel>                    613A
    <x>3.144518753</x>
    <y>3.163196120</y>
    <z>0.002828965</z>
    <basePlane>XY</basePlane>
    <nomX>1.587500000</nomX>
    <nomY>1.587500000</nomY>
    <nomZ>0.000000000</nomZ>
    <tolX>@</tolX>
    <tolY>@</tolY>
    <tolZ>@</tolZ>
    <outputX>REPORT</outputX>
    <outputY>REPORT</outputY>
    <outputZ>REPORT</outputZ>
    <useNominals>FALSE</useNominals>
    <actualDiameter>0.631865874</actualDiameter>
    <nomDiameter>2.000000000</nomDiameter>
    <tolDiameter>@</tolDiameter>
    <outputDiameter>REPORT</outputDiameter>
    <actualRadius>0.315932937</actualRadius>
    <nomRadius>1.000000000</nomRadius>                              614A
    <tolRadius>@</tolRadius>
    <outputRadius>REPORT</outputRadius>
    <actualCircularity>0.246104183</actualCircularity>
    <tolCircularity>@</tolCircularity>
    <outputCircularity>REPORT</outputCircularity>
    <tolConcentricity>@</tolConcentricity>
    <outputConcentricity>NONE</outputConcentricity>
    <tolTruePosition>@</tolTruePosition>
    <outputTruePosition>NONE</outputTruePosition>
    <tolRunout>@</tolRunout>
    <outputRunout>NONE</outputRunout>
    <tolSymmetry>@</tolSymmetry>
    <outputSymmetry>NONE</outputSymmetry>
    <projectionPlane>NONE</projectionPlane>
    <circleType>UNKNOWN</circleType>
    <datumType>NONE</datumType>
    <outlier>0.000000000</outlier>
  </DefineCircle>
</Measure>
```

*Fig. 6C-2.*

355[2,3]M (Unedited)

```xml
-<Measure breakpoint="FALSE" nodeID="{CE4C2A6D-5E2F-47D3-AA36-DE85A167C05D}"
returnCode="MIML_OK" blockMarker="FALSE" simulationStatus="questionable">
  -<ImageSetContext breakpoint="FALSE" nodeID="{F3489958-494C-4DBE-91BB-CA6EF578D0F7}"
  returnCode="MIML_OK" blockMarker="FALSE" simulationStatus="questionable">
    <x>3.174253555</x>
    <y>4.761891426</y>
    <z>-0.000600000</z>
    <coax>0</coax>              ── 610B
    <stage>27</stage>
    <ringFront>0</ringFront>
    <ringBack>0</ringBack>
    <ringRight>0</ringRight>
    <ringLeft>0</ringLeft>
    <mirrorLevel>0</mirrorLevel>
    <color>WHITE</color>
    <magnification>5.000000000</magnification>
  </ImageSetContext>
  -<CircleTool breakpoint="FALSE" nodeID="{26EB131B-D3D6-470A-BE77-5CD8943CC640}"
  returnCode="MIML_OK" blockMarker="FALSE" simulationStatus="questionable">
    <vcs>FALSE</vcs>
    <x>3.170228227</x>
    <y>4.740332420</y>
    <z>-0.000700000</z>
    <r1>0.421400000</r1>
    <r2>0.225400000</r2>
    <outlier>0.000000000</outlier>
    <th>112.564885496</th>
    <thr>0.488179056</thr>
    <ths>78.000000000</ths>
    <alg>DYNAMIC THRESH</alg>
    <edgeSlope>RISING</edgeSlope>   ── 612B
    <edgeQuality>STRONG</edgeQuality>
    <filterType>@</filterType>
    <dllName>@</dllName>
    <paramList>@</paramList>
    <scanInterval>20</scanInterval>
    <scanIntervalUnits>DEGREES</scanIntervalUnits>
    <samplingDirection>CLOCKWISE</samplingDirection>
    +<simulationData>
  </CircleTool>
```

*From Fig. 6D-1*  →  355[2,3]M (Unedited)

```
-<DefineCircle breakpoint="FALSE" nodeID="{057DC294-55A8-4B88-935A-A9580E096254}"
returnCode="MIML_OK" blockMarker="FALSE" simulationStatus="questionable">
    <featureLabel>Circle-5-2-3</featureLabel>         613B
    <x>1.582952593</x>
    <y>1.588931822</y>
    <z>-0.000600000</z>
    <basePlane>XY</basePlane>
    <nomX>1.587500000</nomX>
    <nomY>3.175000000</nomY>
    <nomZ>0.000000000</nomZ>
    <tolX>@</tolX>
    <tolY>@</tolY>
    <tolZ>@</tolZ>
    <outputX>REPORT</outputX>
    <outputY>REPORT</outputY>
    <outputZ>REPORT</outputZ>
    <useNominals>FALSE</useNominals>
    <actualDiameter>0.623612156</actualDiameter>
    <nomDiameter>2.000000000</nomDiameter>
    <tolDiameter>@</tolDiameter>
    <outputDiameter>REPORT</outputDiameter>
    <actualRadius>0.311806078</actualRadius>
    <nomRadius>1.000000000</nomRadius>                614B
    <tolRadius>@</tolRadius>
    <outputRadius>REPORT</outputRadius>
    <actualCircularity>0.048474793</actualCircularity>
    <tolCircularity>@</tolCircularity>
    <outputCircularity>REPORT</outputCircularity>
    <tolConcentricity>@</tolConcentricity>
    <outputConcentricity>NONE</outputConcentricity>
    <tolTruePosition>@</tolTruePosition>
    <outputTruePosition>NONE</outputTruePosition>
    <tolRunout>@</tolRunout>
    <outputRunout>NONE</outputRunout>
    <tolSymmetry>@</tolSymmetry>
    <outputSymmetry>NONE</outputSymmetry>
    <projectionPlane>NONE</projectionPlane>
    <circleType>UNKNOWN</circleType>
    <datumType>NONE</datumType>
    <outlier>0.000000000</outlier>
  </DefineCircle>
</Measure>
```

*Fig. 6D-2.*

SYSTEM, GUI AND METHOD FOR EDITING STEP AND REPEAT OPERATION INSTRUCTIONS IN A MACHINE VISION INSPECTION SYSTEM

TECHNICAL FIELD

The invention relates generally to machine vision inspection systems, and more particularly to systems, GUIs and methods embodied in computer-readable media for converting step-and-repeat operations programmed for such systems into a more versatile editable form.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision workstage that is movable in multiple directions to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This series of products, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface (GUI), or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) and other GUI features may be set up manually to accomplish inspection and/or other machine control operations. Video tools' set-up parameters and operations can also be recorded during learn mode, in order to create automatic inspection programs, or "part programs," which incorporate measurement/analytical operations to be performed by various video tools. Video tools may include, for example, edge/boundary detection tools, autofocus tools, shape or pattern matching tools, dimension measuring tools, and the like. Other GUI features may include dialog boxes related to data analysis, step and repeat loop programming—as disclosed, for example, in U.S. Pat. No. 8,271,895, (the '895 patent) which is hereby incorporated herein by reference in its entirety—etc. For example, such tools and GUI features are routinely used in a variety of commercially available machine vision inspection systems, such as the QUICK VISION® series of vision systems and the associated QVPAK® software, discussed above.

The currently available features and GUI controls for step-and-repeat programming are limited. Briefly, in the context of machine vision inspection systems, step-and-repeat programming involves programming imaging/analytical operations to be repeatedly executed N times at N locations in an array of workpiece features (e.g. workpiece features arranged at locations in a regularly-spaced grid). For example, when a workpiece is supposed to have 8 instances of a circular hole arranged in an array, the step-and-repeat programming permits a user to define a single block of instructions to image/analyze the hole, which will then be executed 8 times, as opposed to having to separately define 8 sets of instructions. However, when a single set of instructions is to be executed multiple times, each time with the workstage shifted to image/analyze each of the features in the array, there currently is no convenient method for a relatively unskilled user (e.g. one that is not skilled in text-based computer programming in an underlying part program language) to edit or make adjustments to the instructions with respect to a particular one of the features.

The present invention is directed to providing a system, GUI and method as embodied in a computer-readable medium, which allow intuitive, flexible and robust conversion of step-and-repeat operation instructions to a more versatile editable form in part programs for precision machine vision inspection systems.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various embodiments, a machine vision inspection system is provided, which is operable in a learn mode to create a part program and in a run mode to execute a previously-created part program. The system includes an imaging portion, a stage for holding one or more workpieces in a field of view of the imaging portion, a control portion, and a graphical user interface (GUI). The system further includes an editing portion operable to edit part program instructions in the learn mode, the editing portion including an editing interface portion displayable in the GUI. The system further includes a step and repeat loop generator configured to be operable to generate and define, in the learn mode, a step-and-repeat programming element in a part program, the defined step-and-repeat programming element defining a repeated operation block of inspection instructions to be executed N times at N defined locations in an array of workpiece features. The system further includes a step and repeat loop converter configured to be operable, in the learn mode, to provide step and repeat conversion operations directed to a defined step-and-repeat programming element, wherein the conversion operations comprise: a) Automatically replicating the inspection instructions defined in the repeated operation block of the defined the step-and-repeat programming element to generate N independently-editable code blocks, each including an independently-editable substantial replication of the inspection instructions defined in the repeated operation block, each of the independently-editable code blocks to be executed at a respective location corresponding to one of the N defined locations; b) Automatically providing a representation of the N independently-editable code blocks in the editing interface portion of the GUI, each of the N code block representations including an editable representation of operations included in its replicated instance of the repeated operation block; and c) Eliminating the defined step-and-repeat programming element as an editable element in the editing interface portion of the GUI. As used herein, the phrase substantial replication does not necessarily mean a literal or exact replication of all details of the inspection instructions or their representations, although this may be the case in some embodiments. Rather, it means replication of at least the features of the instructions that replicate the essential or fundamental operations of the repeated operations block.

In various embodiments, generating the N independently-editable code blocks includes generating, for each independently-editable code block, independently-editable instructions that determine the respective location where that independently-editable code block is to be executed.

The independently-editable code blocks may comprise machine-executable code instructions written in a markup language (e.g., HTML, XML or a derivative thereof) and associated editable instruction representations that are displayed in the GUI (e.g. in the editing portion). The term code block as used herein generally may encompass both of these associated aspects, unless otherwise indicated by description or context. In various embodiments, generating the N independently-editable code blocks includes generating, for each of the independently-editable code blocks, at least one unique identifier associated with the code block (e.g. a unique code block name or node number or the like). In common with other type of instructions and instruction representations referred to herein, such unique identifiers may be assigned and used in various embodiments to support certain context establishing operations, and/or user interface window synchronization operations, and/or code and representation associations. In one embodiment such associations and features may be implemented as described in co-pending, co-assigned U.S. patent application Ser. No. 13/297,232 (the '232 application), filed Nov. 15, 2011, titled "Machine Vision System Program Editing Environment Including Real Time Context Generation Features," and/or describe in co-pending, co-assigned U.S. patent application Ser. No. 13/676,061 (the '061 Application), filed Nov. 13, 2012, titled "Machine Vision System Program Editing Environment Including Synchronized User Interface Features," which are each hereby incorporated herein by reference in their entirety.

In various embodiments, each of the independently-editable code blocks (e.g. instruction representations and/or the code instructions) may be arranged in a tree structure including one or more parent nodes having one or more child nodes, or the like. User input to edit instruction representations on the GUI may include one or more of adding, deleting, and modifying any of the instruction representations. In some embodiments, some of the nodes correspond to video tools each containing a subset of instructions directed to discrete operation such as a geometry measurement operation or an imaging (e.g., auto-focusing) operation, or an image processing operation, and so on. In various embodiments, each of the independently-editable code blocks may be assigned a unique node name, variable name, and/or code block name. A name may in some embodiments and or situations be changed when the node or code block has been edited.

In various embodiments, a computer-readable medium is provided, which includes computer-executable instructions, which are configured to be loaded onto a computer to enable the computer to perform a method for generating N independently-editable instances of a repeated operation block of inspection operations defined in a step-and-repeat programming element wherein the repeated operation block is to be executed N times at N locations in an array of workpiece features in a machine vision inspection system. N is an integer greater than 1. The machine vision inspection system includes an imaging portion; a stage for holding one or more workpieces in a field of view of the imaging portion; a control portion; and a graphical user interface (GUI). The method to be performed may comprise displaying a representation of the defined step-and-repeat programming element in an editing interface portion of the GUI, and operating the editing interface portion to execute a conversion command directed to the defined step-and-repeat programming element. The conversion command may include and/or perform operations comprising: a) Automatically replicating the inspection instructions defined in the repeated operation block defined in the step-and-repeat programming element to generate N independently-editable code blocks, each including an independently-editable substantial replication of the inspection instructions defined in the repeated operation block, each of the independently-editable code blocks to be executed at a respective location corresponding to one of the N defined locations: b) Automatically providing representation of the N independently-editable code blocks in the editing interface portion of the GUI, each of the N code block representations including an editable representation of the inspection instructions included in its replicated instance of the repeated operation block; and c) Eliminating the defined step-and-repeat programming element as an editable element in the editing interface portion of the GUI. In some embodiments, eliminating the defined step-and-repeat programming element as an editable element comprises deleting the displayed representation of the defined step-and-repeat programming element from the editing interface portion.

In various embodiments, generating the N independently-editable code blocks includes generating independently-editable instructions for each independently-editable code block that determine the respective location where that independently-editable code block is to be executed. Determining the respective location may include motion control instructions.

In some embodiments, operating the editing interface portion to execute the conversion command may comprise selecting the representation of the defined step-and-repeat programming element in the editing interface portion of the GUI, operating the GUI to display a menu including editing commands corresponding to the selected representation of the defined step-and-repeat programming element, and selecting the conversion command in the displayed menu.

In some embodiments or instances, the method to be performed may further comprise providing the defined step-and-repeat programming element by one of a) operating the GUI to create the step-and-repeat programming element and define its repeated operation block and its parameters that define the N locations, and b) opening a previously created part program including the defined step-and-repeat programming element and displaying a representation of the previously created part program in the editing interface portion of the GUI.

In various embodiments or instances, the method to be performed may further comprise providing, via the GUI, user editing input (e.g. adding an instruction, deleting an instruction, and modifying an instruction) to edit one of the independently-editable code blocks, and recording the resulting independently-editable code block in a part program as edited. The editing input may delete one of the independently-editable code blocks, if desired. Editing an independently-editable code block does not affect the other independently-editable code blocks.

In some embodiments, generating the N independently-editable code blocks includes generating, for each of the independently-editable code blocks, at least one unique identifier associated with the code block (e.g. a unique code block name or node number or the like). Such unique identifiers may be used in some embodiments to support certain context establishing operations, and/or user interface window synchronization operations, as described in greater detail below.

DESCRIPTION OF THE DRAWINGS

FIG. 5A-5J are diagrams of various windows, which may be additionally and selectively displayed on a user interface in association with operations related to those illustrated in FIGS. 3A-3I and/or FIGS. 4A-4F.

FIGS. 6A-1; 6A-2; 6B, 6C-1; 6C-2; 6D-1; 6D-2 are diagrams of code instructions written in a markup language, which correspond to a step-and-repeat programming element including a repeated operation block of instructions in one embodiment of step and repeat conversion operations that replace the step and repeat element with code instruction blocks that provide independently-editable instances of its repeated operation block according to principles disclosed herein.

DETAILED DESCRIPTION

Figure 1:
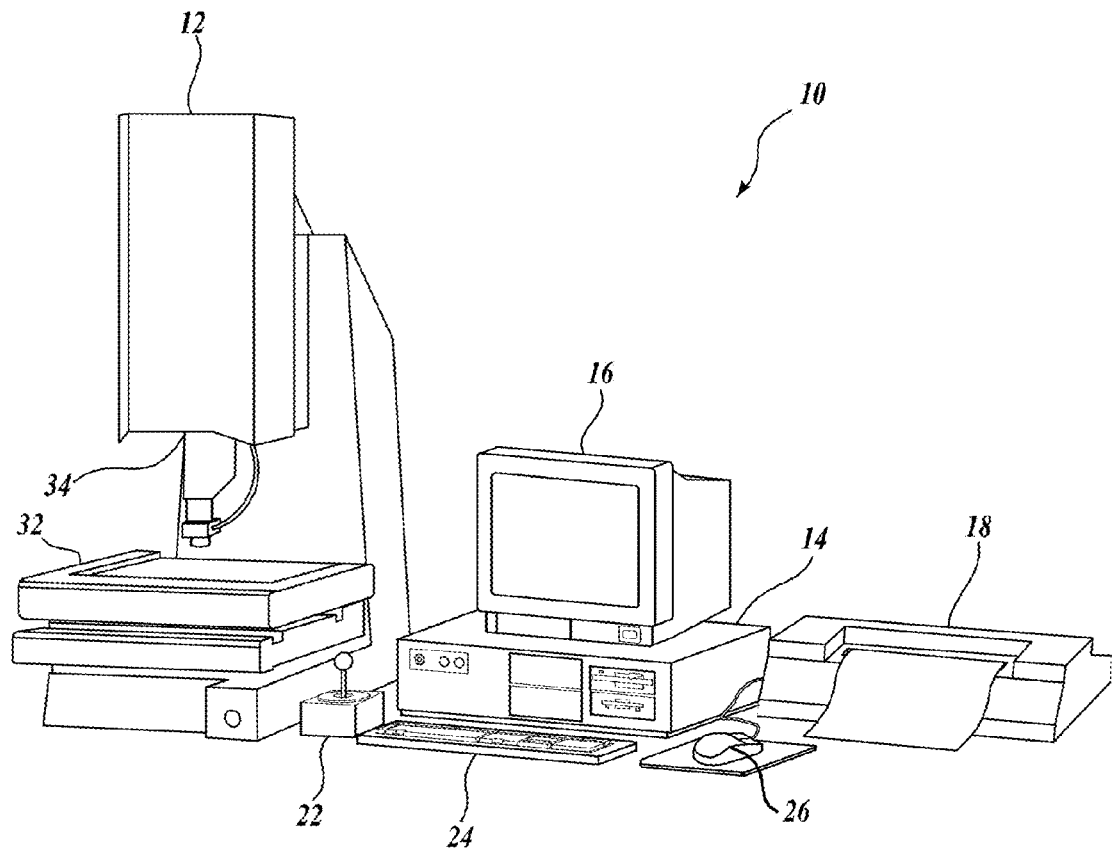
FIG. 1 is a diagram showing various typical components of a general purpose precision machine vision inspection system.

FIG. 1 is a block diagram of one exemplary machine vision inspection system 10 usable in various embodiments of the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10, such as a GUI for generating and editing step-and-repeat instructions according to various embodiments of the present invention.

The vision measuring machine 12 includes a moveable workpiece stage 32, and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, 7,324,682, 8,111,938, and 8,111,905, which are each incorporated herein by reference.

Figure 2A:
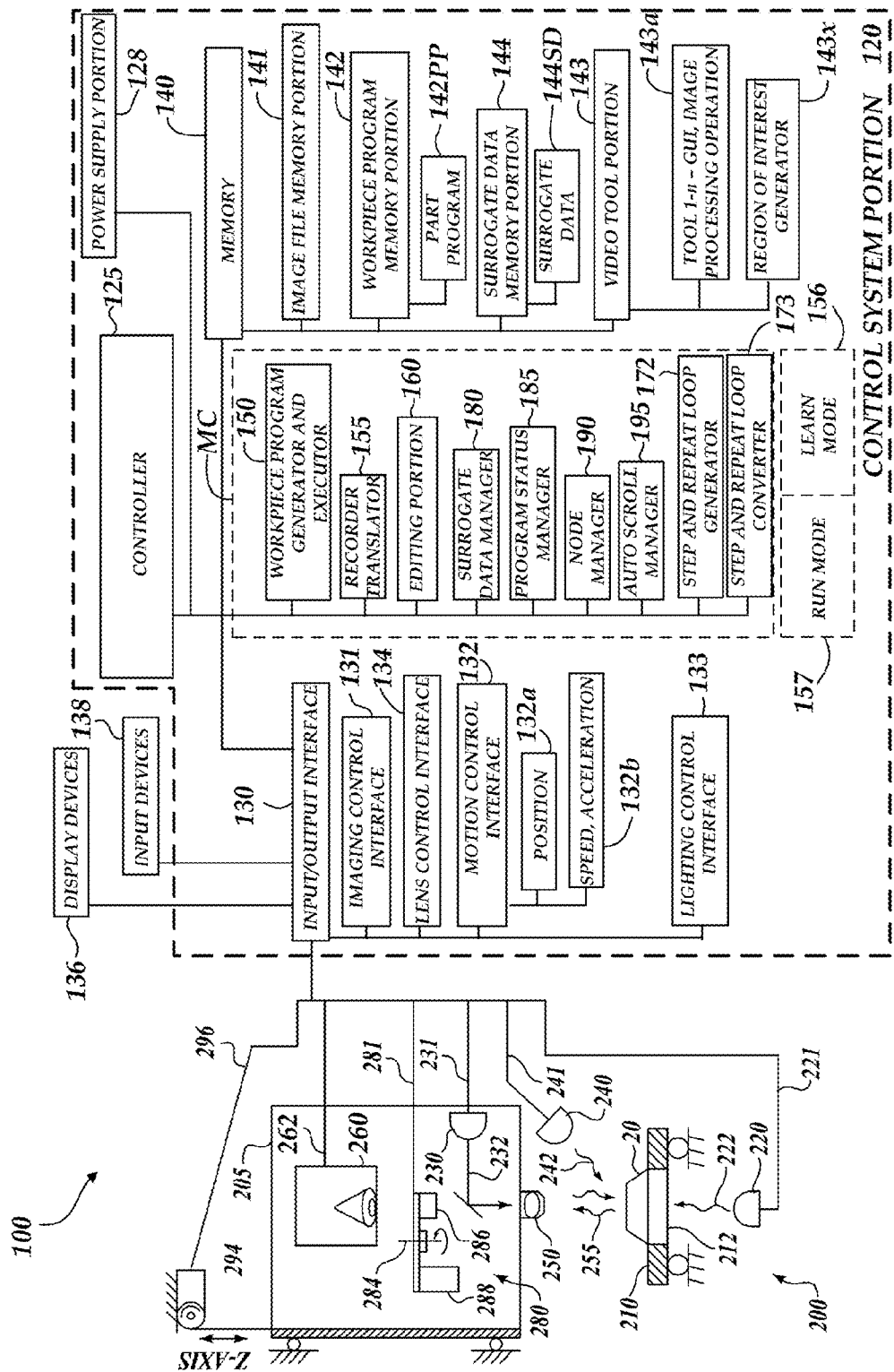
FIGS. 2A and 2B are block diagrams of a control system portion and a vision components portion of a machine vision inspection system similar to that of FIG. 1, including modules and features usable in various embodiments according to this invention.
Figure 2B:
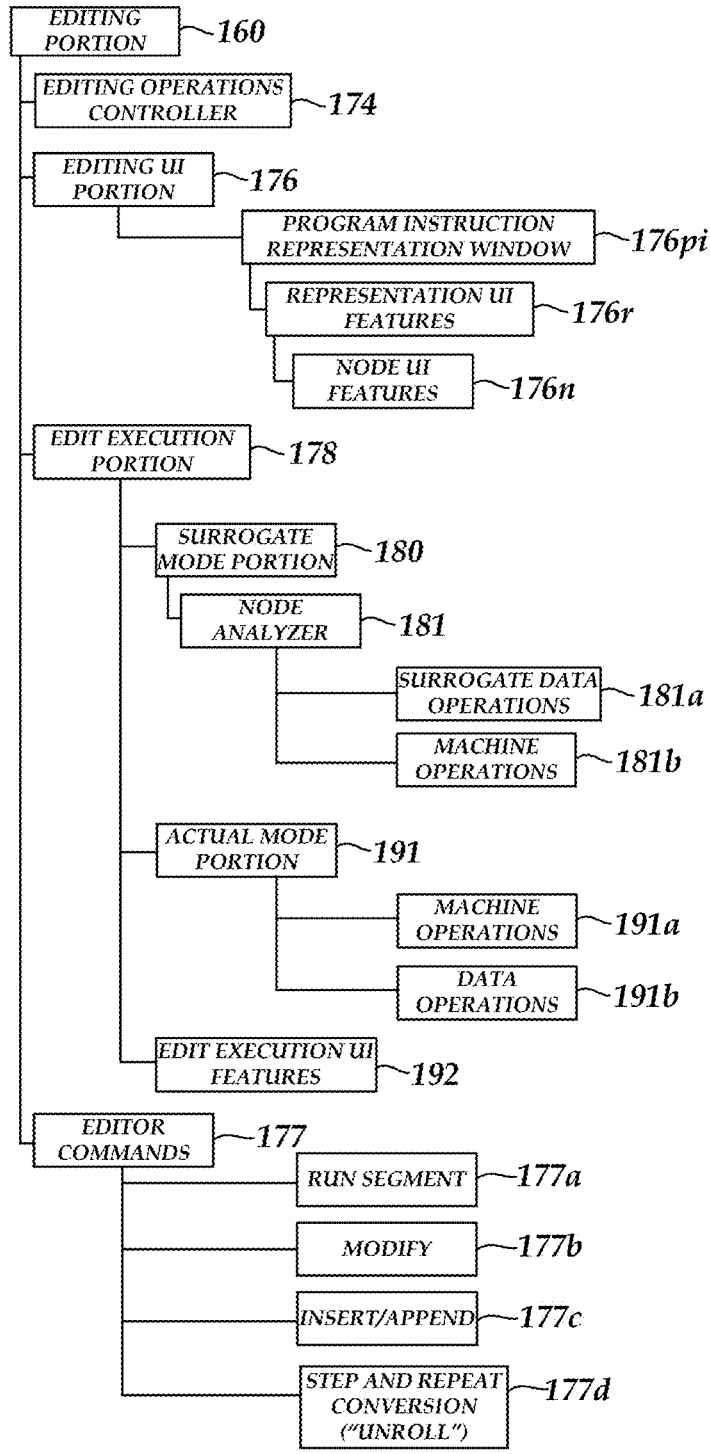

FIGS. 2A and 2B are block diagrams of a control system portion 120 and a vision components portion 200 of a machine vision inspection system 100 similar to the machine vision inspection system 10 of FIG. 1, and the control system portion 120 includes features usable in various embodiments according to the present invention. The control system portion 120 is utilized to control the vision components portion 200. As shown in FIG. 2A, the vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage on which a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. The optical assembly portion 205 is controllably movable along a Z-axis that is generally orthogonal to the X and Y axes, by using a controllable motor 294.

A workpiece 20, or a tray or fixture holding a plurality of workpieces 20, which is to be imaged using the machine vision inspection system 100, is placed on the workpiece stage 210. The workpiece stage 210 may be controlled to move relative to the optical assembly portion 205, such that the interchangeable objective lens 250 moves between locations on a workpiece 20 and/or among a plurality of workpieces 20. One or more of a stage light 220, a coaxial light 230, and a surface light 240 may emit source light 222, 232, or 242, respectively, to illuminate the workpiece or workpieces 20. The source light is reflected or transmitted as workpiece light 255, which passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

In various exemplary embodiments, the optical assembly portion 205 is movable in the vertical Z-axis direction relative to the workpiece stage 210 using a controllable motor 294 that drives an actuator, a connecting cable, or the like, to move the optical assembly portion 205 along the Z-axis to change the focus of the image of the workpiece 20 captured by the camera system 260. The term Z-axis, as used herein, refers to the axis that is intended to be used for focusing the image obtained by the optical assembly portion 205. The controllable motor 294, when used, is connected to the input/output interface 130 via a signal line 296.

As shown in FIG. 2A, in various exemplary embodiments, the control system portion 120 includes a controller 125, a power supply portion 128, the input/output interface 130, a memory 140, a workpiece program (part program) generator and executor 150, a recorder translator 155, a learn mode executor 156, a run mode executor 157, an editing portion 160, a surrogate data manager 180, a program status manager 185, a node manager 190, an auto scroll manager 195, and a step and repeat loop generator 172 and a step and repeat loop converter 173. Each of these components, as well as the additional components described below, may be interconnected by one or more data/control buses and/or application programming interfaces, or by direct connections between the various elements. As apparent to those skilled in the art, any of these components may be merged together, may consist of multiple sub-components, or any of their respective sub-components may be merged together, depending on each implementation.

The input/output interface 130 includes an imaging control interface 131, a motion control interface 132, a lighting control interface 133, and a lens control interface 134. The motion control interface 132 may include a position control element 132a, and a speed/acceleration control element 132b, although such elements may be merged and/or indistinguishable. The lighting control interface 133 controls, for example, the selection, power (intensity), on/off switch, and strobe pulse timing if applicable, for the various corresponding light sources of the machine vision inspection system 100.

The memory 140 includes an image file memory portion 141, a workpiece program memory portion 142 that may include one or more part programs 142PP, or the like, a video tool portion 143, and in the illustrated embodiment a surrogate data memory portion 144 that may include surrogate data 144SD. The video tool portion 143 includes various video tools (collectively 143a) each including the GUI and image processing operation defined to perform a specific function, such as edge/boundary detection tools, autofocus tools, shape or pattern matching tools and dimension measuring tools. Many known video tools are included in commercially available machine vision inspection systems, such as the QUICK VISION® series of vision systems and the associated QVPAK® software discussed above. The video tool portion 143 also includes a region of interest (ROI) generator 143x that supports automatic, semi-automatic and/or manual operations that define various ROIs that are operable in various video tools included in the video tool portion 143.

The surrogate data memory portion 144 includes surrogate data 144SD. In accordance with some embodiments, when editing a part program, rather than being required to execute all of the steps of the part program from the beginning in order to generate the needed context for continuing edits at a certain location in the program, the needed context (both in terms of hardware setting and software parameters and values) can be simulated using previously saved data as surrogate data, as described in the previously referenced '232 application.

In general, the memory portion 140 stores data usable to operate the vision system components portion 200 to capture or acquire an image of the workpiece 20 such that the acquired image of the workpiece 20 has desired image characteristics. The memory portion 140 may also store inspection result data, and may further store data usable to operate the machine vision inspection system 100 to perform various inspection and measurement operations on the acquired images (e.g. implemented, in part, as video tools), either manually or automatically, and to output the measurement results through the input/output interface 130. The memory portion 140 may also contain data defining a user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various user interface features that are usable to perform inspection operations, to create and/or modify part programs including step-and-repeat instructions, to view the images captured by the camera system 260, and/or to directly control the vision system components portion 200. In particular, according to various exemplary embodiments of the present invention, the display devices 136 and input devices 138 are used to present various user interface features usable to allow rapid, efficient, intuitive, flexible and robust editing of step-and-repeat instructions in part programs for the machine vision inspection system 100.

The workpiece generator and executor 150, recorder translator 155, learn mode executor 156, run mode executor 157, editing portion 160, surrogate data manager 180, program status manager 185, node manager 190, auto scroll manager 195, a step and repeat loop generator 172 and a step and repeat loop converter 173 may in one embodiment all be considered to be part of a general machine controller block MC that is linked to the controller 125. The workpiece program generator and executor 150 is responsible for creating and executing part programs. It will be appreciated that the terms "workpiece program" and "part program" may be used interchangeably herein. Based on the operations of the workpiece program generator and executor 150, a user utilizes the machine vision inspection system 100 to create a part program for the workpiece 20, either by explicitly coding the instructions automatically, semi-automatically, or manually, using a workpiece programming language, and/or by generating the instructions by operating the machine vision inspection system 100 in a learn mode (e.g. as controlled by the learn mode executor 156) to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g. using video tools). The learn mode operates such that the "learned" operation sequence(s) are recorded and converted to corresponding part program steps (i.e. instructions). These part program steps, when the part program is executed in a run mode (e.g. as controlled by the run mode executor 157), will cause the machine vision inspection system 100 to reproduce the trained image acquisition and inspection operations to automatically inspect a workpiece or workpieces matching the workpiece used when creating the part program.

The recorder translator 155 is utilized for translating machine operations into part program code. In other words, if a user performs an action (e.g. such as manually altering a video tool that is used to measure a feature on a workpiece), a basic instruction is generated that is translated into a machine readable language to form a part program, and a reverse translation may also be performed. As will be described in more detail below, in various embodiments of the present invention, editable instruction representations are displayed on an editing GUI and the instruction representations point to machine readable code instructions written, for example, in a markup type language. The recorder translator 155 may perform translation between the editable instruction representations and their corresponding code instructions. The editing portion 160 provides or activates various operations and user interface features related to editing a part program, as will be described in more detail below in reference to FIG. 2B.

In some embodiments, the surrogate data manager 180 links to surrogate data, which may be recorded in a part program. In certain implementations, the surrogate data manager 180 is responsible for obtaining the surrogate data from an output where it would normally be generated, and providing the surrogate data to be written into the part program. The program status manager 185, in one embodiment, manages whether programs are protected or unprotected. In one example embodiment, protected programs are programs for which the editing process has been completed, such as may be utilized in a factory in a run mode. In one implementation, an unprotected part program may include stored surrogate data for use in generating the right context for editing purposes. The program status manager 185 is also responsible to ensure that, when a part program is unprotected, the surrogate data remains recorded in the part program and when the part program is recalled by the editing portion 160, the surrogate data is indicated as being available.

In one embodiment, the node manager 190 is responsible for managing node numbers that are assigned to nodes in a part program. In one implementation, within a representation of a part program, each of the instruction representations is assigned a node number. In certain implementations, an organizational tree structure may be utilized that includes parent nodes and child nodes. In certain implementations, every line of a part program representation that is generated by the recorder translator 155 is assigned a node number by the node manager 190. The auto scroll manager 195 utilizes the node numbers assigned by the node manager 190 to display related elements of associated part program elements and corresponding editing functions in different windows at the same time. For example, to allow a user to see which measurements of a workpiece are related to which instruction representations and/or coded instructions in a part program, the auto scroll manager 195 may automatically scroll in the respective windows to the relevant lines in the part program representation and/or coded instructions that correspond to the relevant node number.

The step and repeat loop generator 172 is responsible for creating step-and-repeat programming element instructions and defining N related inspection locations, and the like, which may form part of a workpiece program. In one embodiment, the step and repeat loop generator 172 may be implemented using features disclosed in the previously referenced '895 patent. As described in greater detail below, the step and repeat loop converter 173 is responsible for converting and/or replacing a defined step and repeat loop programming element into a plurality of independently-editable code blocks, each including an independently-editable substantial replication of the inspection instructions defined in a repeated operation block of the step-and-repeat programming element, each of the independently-editable code blocks to be executed at a respective location corresponding to one of the N inspection locations defined in the step and repeat element. The converter 173 may also provide an editable representation of the independently-editable code blocks in the editing interface portion of the GUI, and may also eliminate the step-and-repeat programming element as an editable element in the editing interface portion. To that end, the step and repeat loop generator 172 and the step and repeat loop converter 173 may access and use any of the functions, operations and user interface features provided by the workpiece program generator and executor 150, recorder translator 155, editing portion 160, surrogate data manager 180, program status manager 185, and auto scroll manager 195. Alternative configurations are possible for the step and repeat loop generator 172 and converter 173. For example, in some embodiments, the step and repeat loop generator 172 and converter 173 and one or more of the workpiece program generator and executor 150, recorder translator 155, editing portion 160, surrogate data manager 180, program status manager 185, and auto scroll manager 195 may be merged and/or indistinguishable. Generally, the invention may be implemented in any now known or later-developed form that is operable in conjunction with the machine vision inspection system 100 to provide the user interface features and related programming and other operations disclosed herein.

FIG. 2B illustrates additional components of the editing portion 160 of FIG. 2A. As shown in FIG. 2B, the editing portion 160 includes an editing operations controller 174, an editing user interface portion 176, an editor commands portion 177 and an edit execution portion 178. The editing operation controller 174 controls the operations for the editing functions, and the editing user interface portion 176 provides the user interface features for the editing functions. The editing user interface portion 176 includes a program instruction representation window 176pi, which includes representation user interface features 176r, which includes node user interface features 176n. The program instruction representation window 176pi provides a part program representation, including an editable representation of step-and-repeat instructions, instructions generated by the step-and-repeat converter 173, and the like, as will be described in more detail below with respect to FIGS. 3A-3I. In one embodiment, the graphical representation of step-and-repeat instructions and the instructions generated by the step-and-repeat converter 173 may be provided in a tree structure including parent nodes, each including one or more child nodes. The representation user interface features 176r provides features such as various pull down menus for a user to select among multiple editing options, and a tool bar including various video tools that a user can select and open in order to create and edit various instructions, including instructions in step and repeat loops and/or the instructions generated by the step and repeat loop generator converter 173, or the like. The node user interface features 176N, in one embodiment, may include features such as icons and color highlights to indicate if a node corresponding to a certain instruction or block of instructions is being edited or has been edited, etc., e.g. as disclosed in the previously referenced '232 application.

In various embodiments, the edit execution portion 178 is responsible for various edit execution modes during an editing process in the learn mode, including an edit mode of execution that is different from a run mode of execution in the run mode. Generally, the run mode of execution executes a part program from the beginning to acquire and process (e.g., inspect and analyze) actual data obtained from imaging a workpiece. On the other hand, the edit mode of execution in various embodiments is operable to substitute at least some of the actual data with "surrogate data" previously recorded, so that the execution may start at any desired point in the part program using the surrogate data, as opposed to having to start from the beginning of the part program in order to acquire actual data. That is, the edit mode of execution in various embodiments is capable of efficiently generating the right context necessary for editing any portion of a part program. It should be noted that editing a part program for a machine vision inspection system is a more complex task than editing a program for a machine tool or assembly robot or the like. For example, part programs for machine vision inspection systems include later (subsequent) portions that control operations and/or provide image-dependent measurement results that depend at least partially on the results achieved/obtained by the execution of a previous portion of the program and/or on the particular instance of a workpiece that is being imaged to be analyzed. Note also that the vision system typically consists of various mechanical, electrical and optical elements that interact with each other in a complex manner to carry out imaging/analytical operations. Thus, editing any portion of a part program, including step-and-repeat instructions, must be done in the right context based on a realistic set of conditions, i.e., with various hardware and software elements and parameters of the vision system properly set (based on realistic data) for that portion to be edited. A standard practice for achieving the right context for editing a part program is to have a vision system actually execute all of the instructions in a part program from the beginning up to and/or including a portion of the instructions to be edited, which is time-consuming, wasteful, and may be even impractical for a large part program. One solution that provides a vision system editing environment capable of generating the right context for a particular node of a part program to be edited, based on use of "surrogate data," is disclosed in the previously referenced '232 application.

In some embodiments, the edit execution portion 178 includes a surrogate mode portion 180, an actual mode portion 191, and an edit execution user interface features portion 192. The surrogate mode portion 180 includes a node analyzer 181, which includes surrogate data operations 181a and machine operations 181b. When the surrogate mode portion 180 operates a surrogate execution mode, surrogate data is utilized for generating context for the continuing editing operations. The node analyzer 181 in one implementation determines whether the part program execution has reached a target node (e.g. where a modification is to be made in the part program). The node analyzer 181 determines whether the surrogate data operations 181A or actual machine operations 181B will be performed, in accordance with the type of node that is involved. In general, once the target node is reached, then actual machine operations are performed, whereas for part program instructions prior to the target node, surrogate data operations may be utilized for generating at least some of the context that is needed for the continuing editing operations. If surrogate data is missing, a user may be prompted to allow/perform actual machine operations to generate the needed context. In one implementation, each node is analyzed to determine if surrogate data operations are applicable, including whether surrogate data exists, if it is the right type of node for surrogate data operations, or whether actual machine operations need to be utilized, etc. For example, some nodes in a part program may require actual machine operations such as actual movement of the workpiece stage, the imaging portion, etc, to acquire actual data, which cannot be substituted with surrogate data.

The actual mode portion 191 includes operations that are more traditionally performed by prior machine vision systems. It will be appreciated that the actual mode portion 191 may also be called by the surrogate mode portion 180 for performing the machine operations 181b, when appropriate. The actual mode portion 191 includes machine operations 191a and data operations 191b. The machine operations 191a perform actual machine operations (e.g. moving the stage as part of a video tool operation), while the data operations 191b generally output data. The edit execution user interface features 192 provide user interface features for the execution of the editing functions (e.g. indications as to the status of various execution operations, such as color codes indicating what portions of a part program have utilized surrogate data, or have been run through an actual execution, etc.) In various embodiments, such features may be implemented as disclosed in the previously referenced '232 application.

The editor commands 177 include a run segment portion 177a, a modify portion 177b, an insert/append portion 177c, and a step and repeat loop conversion command 177d. The step and repeat loop conversion command 177d may activate operations of the step and repeat loop converter 173, and/or various step and repeat loop conversion operations and methods as disclosed and claimed herein. As discussed above, in various embodiments, the step and repeat loop converter 173 may access and use any of the functions and features provided by the editing portion 160 including the editing operations controller 174, editing UI portion 176, edit execution portion 178 and editor commands 177. The operations of the modify portion 177b and insert/append portion 177c will be described in more detail below with respect to FIGS. 3A-3I.

In general, the run segment portion 177a performs an actual run of a selected segment of the part program. It will be appreciated that in order to run a selected segment of a part program, the proper context up to the selected segment must be established. The proper context may be established by utilizing surrogate data.

The modify portion 177b has certain similarities to the operation of the run segment portion 177a. In general, when an instruction representation in a part program is selected to be modified (edited), then the surrogate mode may be utilized for the portions of the part program that precede the instruction to be modified so as to generate the right context for the editing purposes. In one embodiment, when the modify command is selected for an instruction representation in a part program, the node for the instruction representation is designated as a target node. Once the target node is reached, the editor switches out of the surrogate mode into the actual execution mode (e.g. as controlled by the actual mode portion 191) and executes the first relevant part program instruction of the target node.

In the following paragraphs, FIGS. 3A-3I, FIGS. 4A-4F, FIGS. 5A-5J and FIGS. 6A-6D are frequently referenced in an interleaved fashion rather than a sequential fashion. This is due to the arrangement of the figures in groups that have a consistent type of element for continuity (e.g. primarily different types of GUI elements in one group, code instruction examples in another group, and so on), while the arrangement of the description is in terms of functional and/or sequential relationships between the different types of elements (e.g. between a GUI input and a resulting instruction modification). In particular, FIGS. 3A-3I are diagrams of an editing interface, or GUI, including a representation of a step-and-repeat programming element including a repeated operation block of instructions and representations of one embodiment of step and repeat conversion operations that replace the step and repeat element with code blocks including independently-editable instances of its repeated operation block according to principles disclosed herein, as well as various windows, menus and tool bars configured to assist a user in editing any of the independently-editable instances. FIGS. 4A-4F are diagrams of a user interface including an image of a workpiece, which is used to define the repeated operation block instructions and other parameters of the step-and-repeat programming element corresponding to FIGS. 3A-3I. FIG. 5A-5J are diagrams of various windows, which may be additionally and selectively displayed on a user interface in association with operations related to those illustrated in FIGS. 3A-3I and/or FIGS. 4A-4F. FIGS. 6A-6D are diagrams of code instructions written in a markup language, which correspond to a step-and-repeat programming element including a repeated operation block of instructions in one embodiment of step and repeat conversion operations that replace the step and repeat element with code instruction blocks that provide independently-editable instances of its repeated operation block according to principles disclosed herein.

Figure 3A:
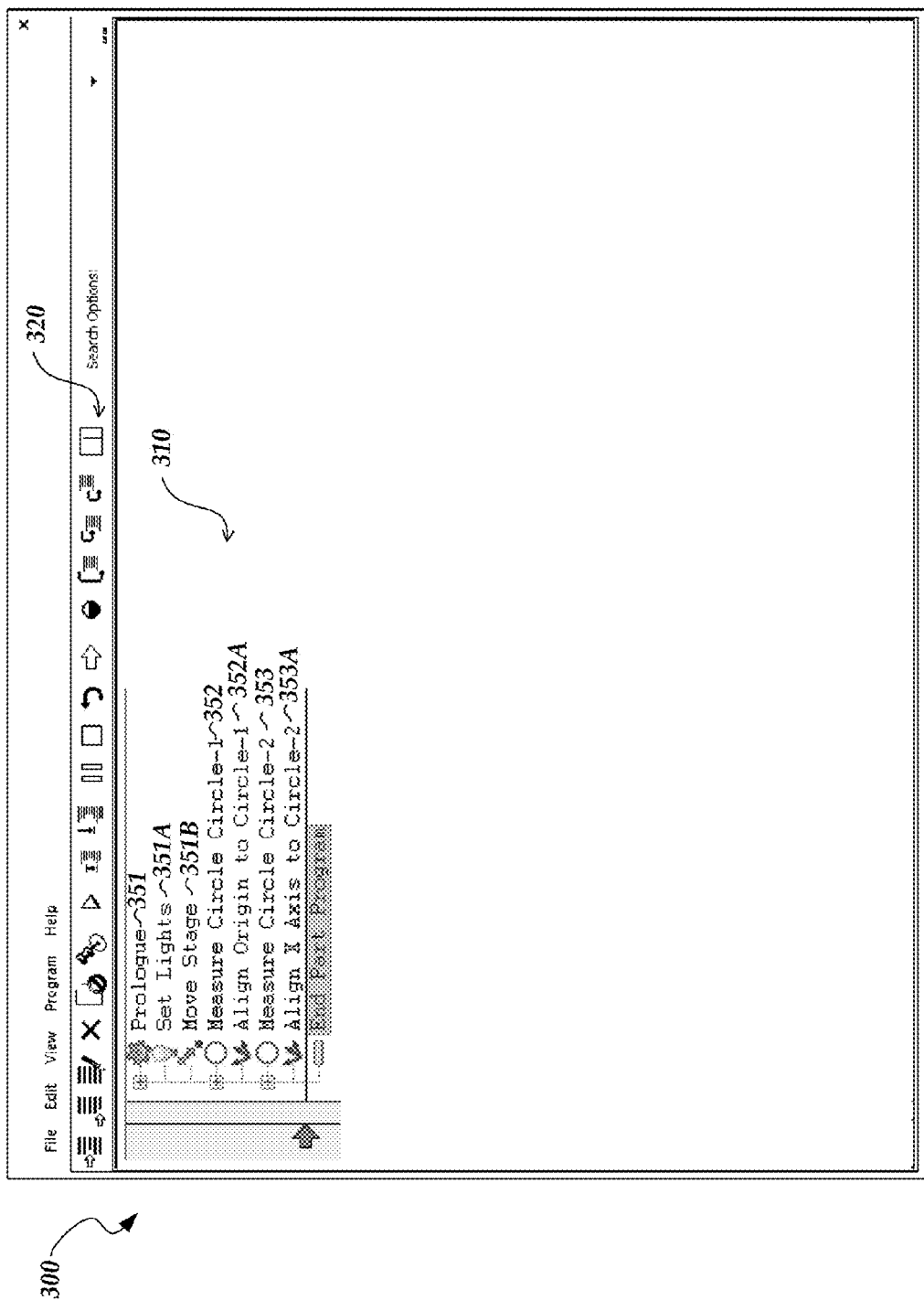
FIGS. 3A-3I are diagrams of an editing interface, or GUI, including a representation of a step-and-repeat programming element including a repeated operation block of instructions and representations of one embodiment of step and repeat conversion operations that replace the step and repeat element with code blocks including independently-editable instances of its repeated operation block according to principles disclosed herein, as well as various windows, menus and tool bars configured to assist a user in editing any of the independently-editable instances.

FIG. 3A is a diagram of an editing interface 300 including a representation of a part program 310 that has a plurality of initial part program instruction representations 351-353, which may be displayed on the display device 136 (e.g., the display 16 of FIG. 1). The editing interface 300 permits user generation and editing of a part program including step-and-repeat instructions for a machine vision inspection system. The editing interface 300 also includes various measurement and/or operation selection bars such as the selection bar 320. The operation of the instruction representations 351-353 of the part program representation 310 will be described below in additional reference to FIG. 4A.

Figure 4A:
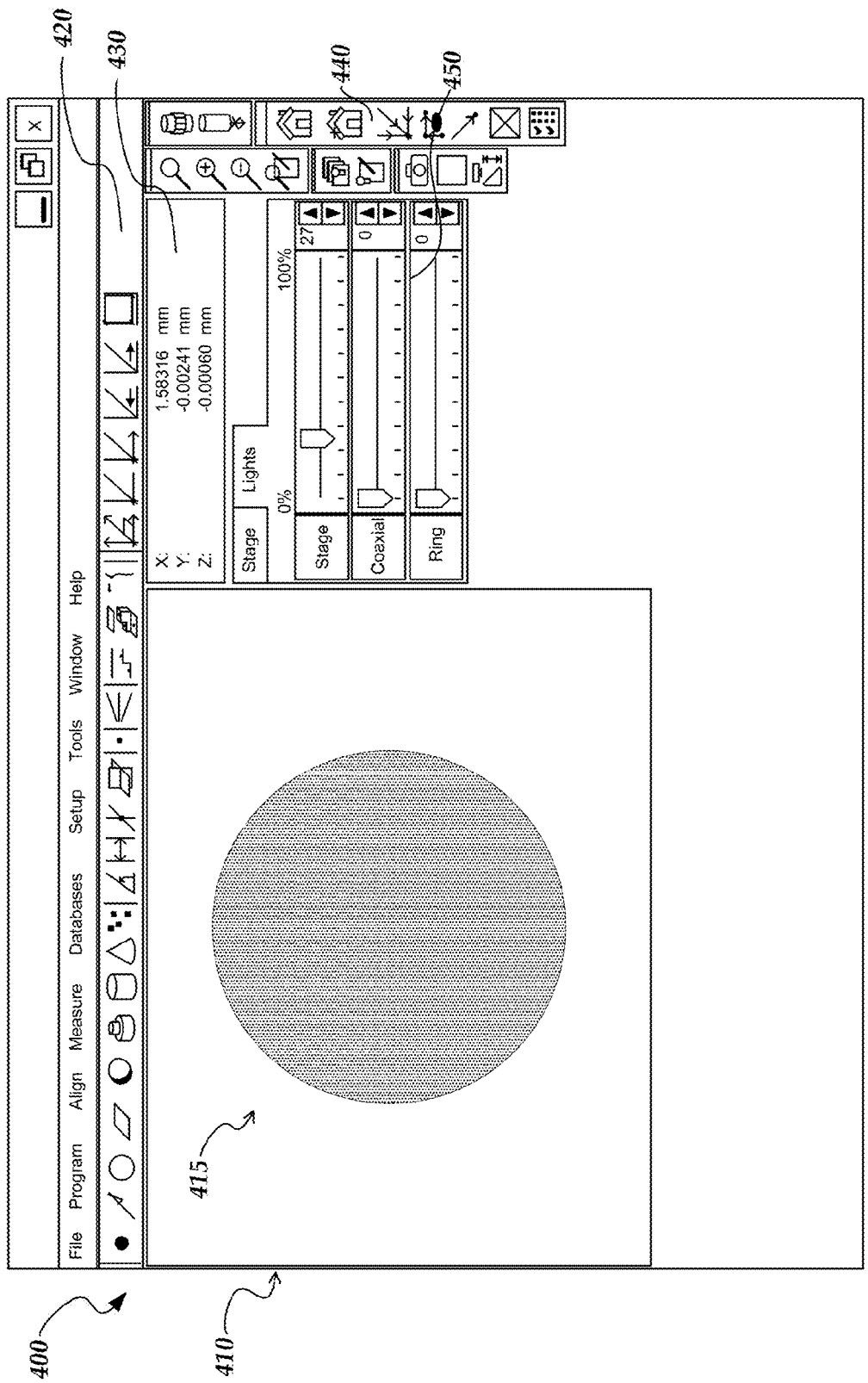
FIGS. 4A-4F are diagrams of a user interface including an image of a workpiece, which is used to define the repeated operation block instructions and other parameters of the step-and-repeat programming element corresponding to FIGS. 3A-3I.

FIG. 4A is a diagram illustrating an image interface 400 also displayed on the display device 136, including a field of view window 410 that displays a (video) image of a workpiece 415, on which the part program of FIG. 3A may be executed. The machine vision system executes a part program on multiple discrete workpieces in some implementations, and on multiple workpiece features in a single workpiece in other implementations, such as multiple holes defined through a surface. Thus, the terms "workpiece" and "workpiece feature" may be used interchangeably herein, in certain contexts. The image interface 400 also includes various measurement and/or operation selection bars such as the selection bars 420 and 440, and a real-time X-Y-Z (position) coordinate window 430 indicating the X-Y-Z position of a workpiece being imaged/analyzed on the workpiece stage 210 in the relevant coordinate system. The coordinate system provides a reference for measurement, and is typically a workpiece coordinate system (e.g., using one corner of a rectangular workpiece as the origin) or a machine coordinate system defined by the linear scales of the workpiece stage. The image interface 400 still further includes a light control window 450.

Referring back to the example shown in FIG. 3A, the part program representation 310 is set up to determine features of a generally circular workpiece feature 415, such as a hole defined through a surface. In one embodiment, each of the part program instruction representations 351-353 is associated with a node, and is assigned a node number (e.g. as disclosed in the previously referenced '232 application and/or '061 application.) In certain implementations, a tree-structure is utilized, wherein some of the instructions representations are associated with parent nodes, and some are associated with child nodes. For example, the children node instruction representations 351A&B, 352A and 353A are respectively associated with their parent node instruction representations 351, 352 and 353. As used herein, each of the program instruction representation as displayed on the editing interface 300 may be interchangeably referred to as a "node." It will also be appreciated that, in one embodiment, the instruction representations 351-353 as displayed on the editing interface 300 comprise icons and labels derived from the markup language instructions (code instructions) of the part program. In some embodiments, the markup language of the part program may comprise XML-like code such as a customized markup language code. The instruction representations 351-353 thus "point to" or have and association with associated code instructions that are machine-executable, which will be described in more detail below in reference to FIGS. 6A-6D.

As shown in FIG. 3A, a "Prologue" node 351 represents a process needed to run a part program in the run mode, which is typically generated when the learn mode is entered. The "Prologue" node 351 is a parent node, which includes two child nodes: a "Set Lights" node 351A and a "Move Stage" node 351B. The "Set Lights" node 351A defines what type of lighting is used at what intensity level, which a user can readily set and adjust using the sliding bars included in the light control window 450 (FIG. 4A). In the illustrated example, a "Stage" light is used at 27% intensity level. The "Move Stage" node 351B defines the position of the stage that holds the workpiece, as manually set by the user according to various implementations. In FIG. 3A, the subsequent two "Measure Circle" nodes 352, 353 operate to set the workpiece coordinate system by aligning the coordinate system with the generally circular workpiece feature 415 of FIG. 4A. Specifically, a "Measure Circle Circle-1" node 352 includes a child node "Align Origin to Circle-1" that aligns the origin of the coordinate system with a center of a defined circle, Circle-1. A "Measure Circle Circle-2" node 353 includes a child node "Align X Axis to Circle-2" that rotates the X axis of the coordinate system about the Z axis to be aligned with a corresponding line of a defined Circle-2. The operations of the instruction representations 351-353 therefore establish the correct location and orientation of the workpiece 415 in the relevant coordinate system for performing additional measurements.

Figure 4B:
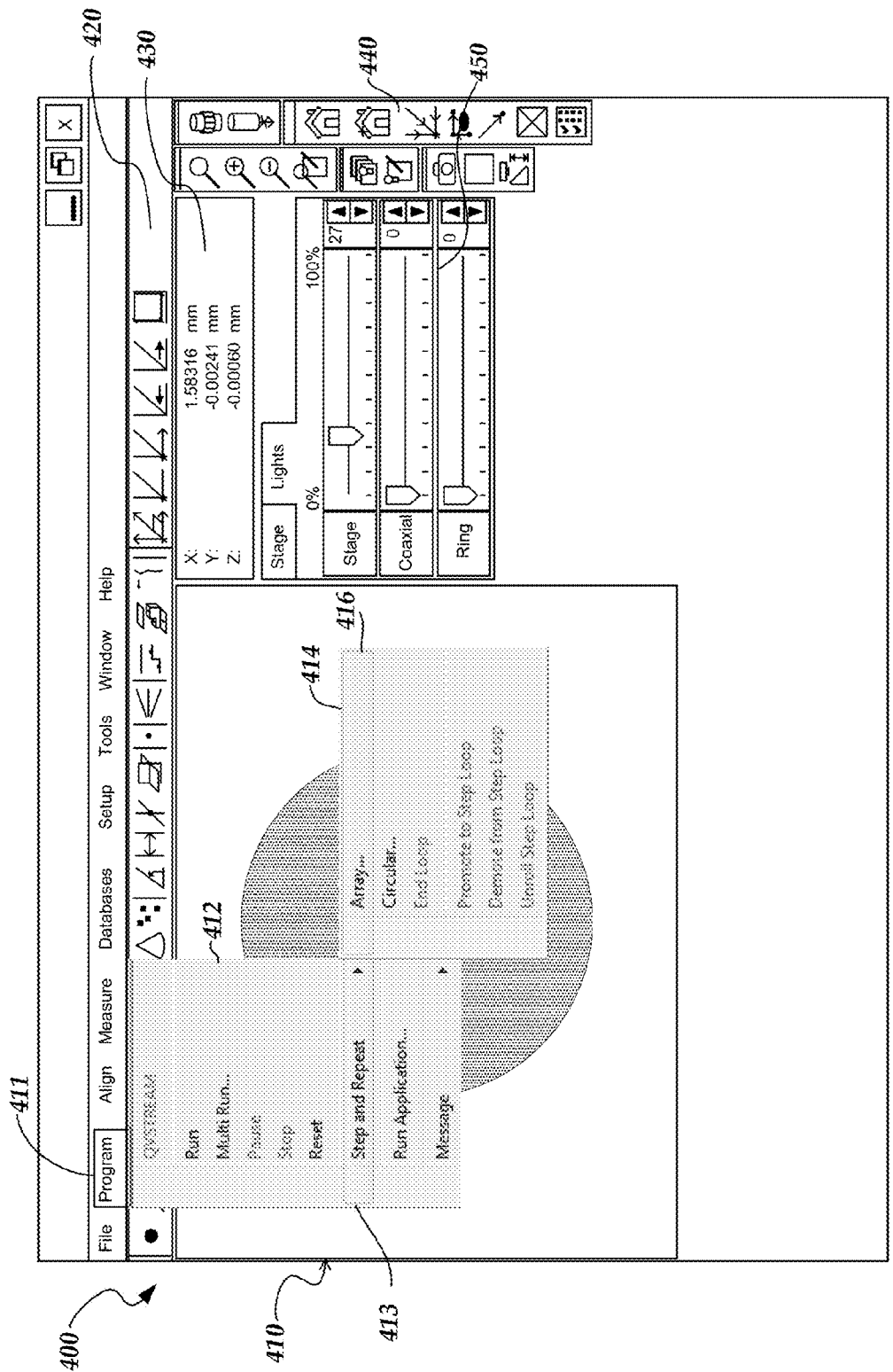

Referring to FIG. 4B, a user may define step-and-repeat instructions using various GUI features according to embodiments of the present invention. Specifically, when a user places a selector (e.g. cursor) over a "Program" option 411, a pull down menu 413 may appear, which includes a "Step and Repeat" option 413. User selection of the "Step and Repeat"

option 413 displays another pull down menu 414, which includes an "Array" option 416. The user may select the "Array" option 416 to start defining the instructions of a step-and-repeat programming element comprising a repeated operation block of inspection operations, wherein the repeated operation block is to be executed N times at N defined locations in an array of workpiece features.

Figure 5A:
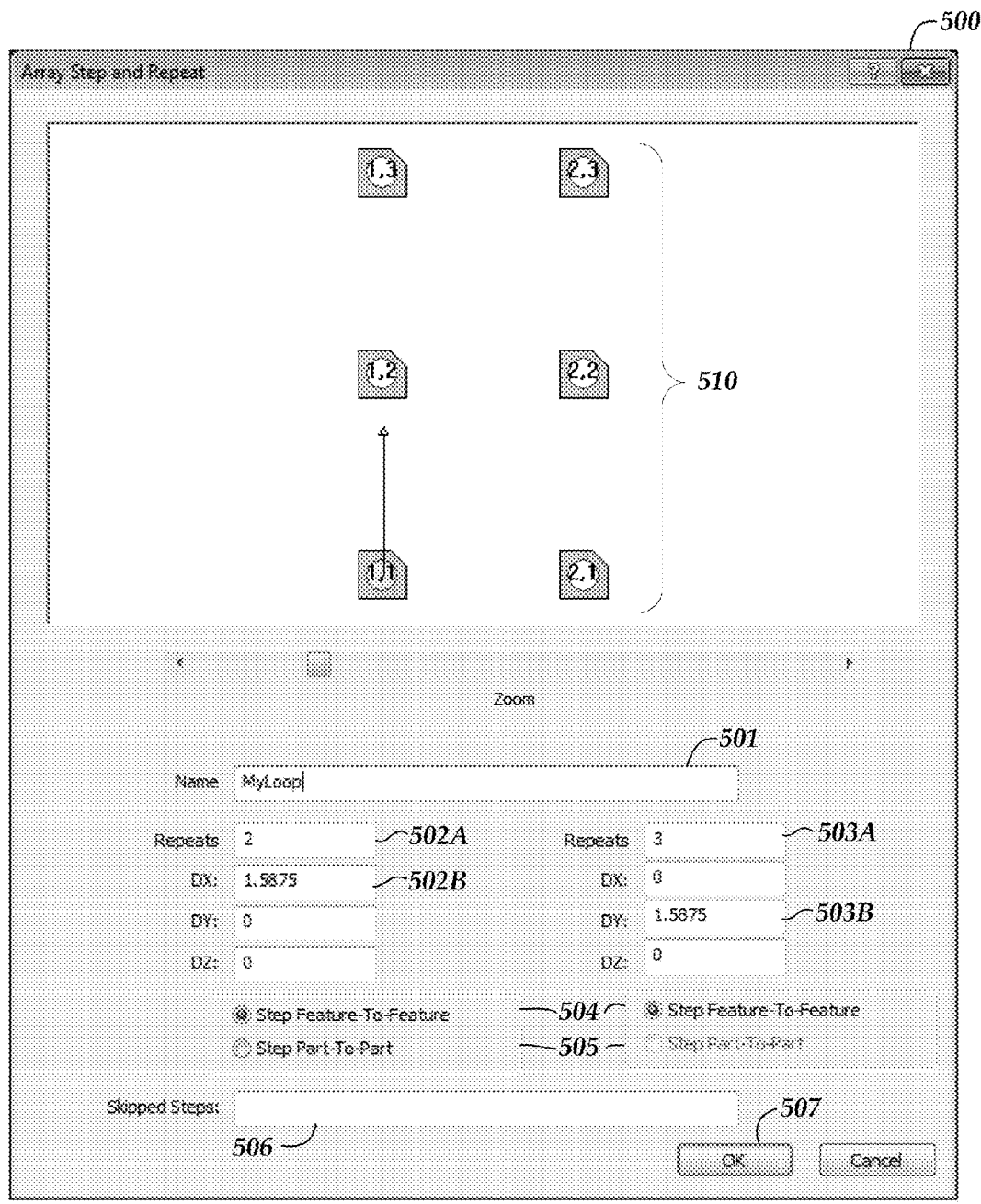

Referring to FIG. 5A, in the illustrated embodiment, upon user selection of the "Array" option 416 as described above, an "Array Step and Repeat" window 500 may appear on the display screen, to prompt the user to define the overall arrangement and structure of an array. In some embodiments, the user may enter the name of the array in a name box 501, in which the user has entered "MyLoop" in the illustrated example. The user further defines the number of repeats to be made along one axis (e.g. X axis) in a first repeats box 502A, and defines the interval distance between the repeats along the same axis in a "DX" box 502A. Similarly, the user defines the number of repeats to be made along another axis (e.g. Y axis) in a second repeats box 503A, and defines the interval distance between the repeats along that axis in a "DY" box 503B. In the illustrated example, the user has defined that a basic set of step-and-repeat instructions is to be repeated 2 times along the X axis with the interval of 1.5875 and to be repeated 3 times along the Y axis with the interval of 1.5875, as graphically represented by six (6) icons 510 that are respectively numbered [1,1], [1,2], [1,3] and [2,1], [2,2], [2,3]. The "Array Step and Repeat" window 500 may also prompt the user to define whether the basic set of step-and-repeat instructions is to be repeated feature to feature on a single workpiece 504, or is to be repeated workpiece to workpiece on multiple workpieces 505, along each of the axes. The window 500 may still further allow the user to identify any member (feature) of the array that should be skipped in a "Skipped Steps" box 506. For example, if the user wishes the basic set of step-and-repeat instructions to be executed five times at five locations [1,1], [1,2], [1,3] and [2,1], [2,2] but not at location [2,3], that is, when the user wishes to skip location [2,3], the user may enter [2,3] in the "Skipped Steps" box 506. Then, the basic set of step-and-repeat instructions will not be executed at location [2,3], that is, location [2,3] will be skipped. When the user finishes defining the locations of the array, the user selects an OK button 507 to save the defined locations.

Figure 3B:
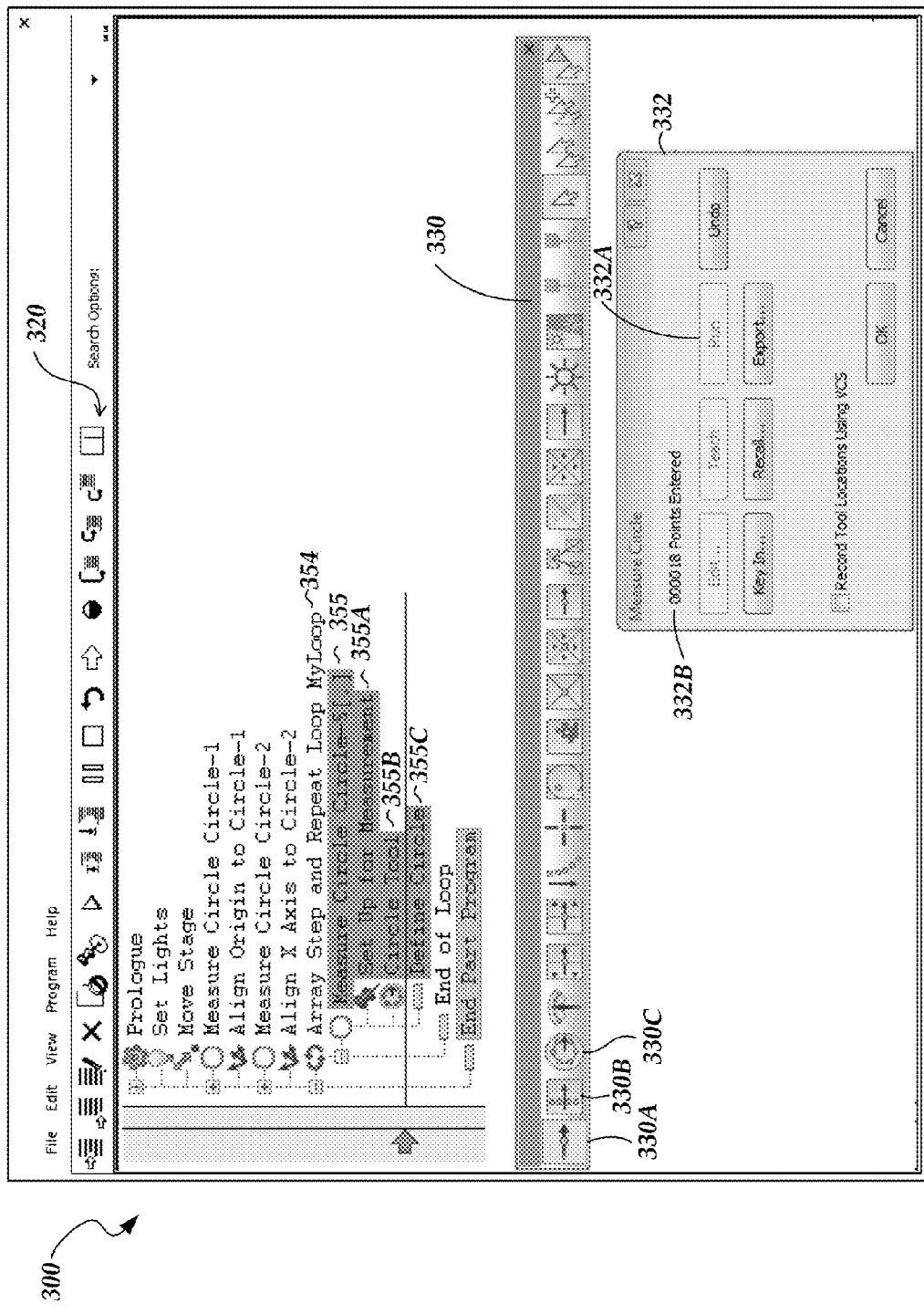

Referring to FIG. 3B, the user may then define the repeated operation block to be repeatedly executed N times on the array of N workpieces or workpiece features as defined in FIG. 5A above. Specifically, in the editing interface 300, a video tool bar 330 may appear in appropriate situations, which includes various icons representing video tools that the user can select and utilize to define different measurement/ inspection operations, such as a point tool 330A, a box tool 330B, and a circle tool 330C. In some embodiments, the tool bar 330 may appear upon user completion of the definition of the array as shown in FIG. 5A above. In other embodiments, the user may explicitly request that the tool bar 330 be displayed in the editing interface 300. Briefly, the point tool 330A is configured to be used to determine the X-Y-Z coordinates of a point. The box tool 330B is configured to determine points that can be used to define a line (e.g. by best fit operations), as well as the angles that the line forms with the X-, Y- and Z-axes and the X-Y plane, respectively, and also the straightness of the line. The circle tool 330C is configured to determine points that can be used to define a circle (e.g. by best fit operations), including the X-Y-Z coordinates of the center of a circle, as well as the diameter, radius, and circularity (roundness) of the circle. The point tool 330A, box tool 330B and circle tool 330C are all edge detection tools that are configured to identify edge points to define/measure a particular geometry. The functions and operations of these and other video tools are known in the art and are described in more detail in the previously incorporated references.

In the illustrated example, the user has selected the circle tool 330C and applied it to the image of the workpiece 415 in the field of view window 410 (see FIG. 4C), which may cause generation of a "Measure Circle Circle-5 [,]" node 355 as a child node to a parent node of "Array Step and Repeat Loop MyLoop" 354 in the editing interface 300. (In the "Measure Circle Circle-5," 5 is used as an identifier of a circle to be determined.) In one embodiment, the "Measure Circle Circle-5 [,]" node 355 automatically includes three child nodes: a "Set Up For Measurement" node 355A, a "Circle Tool" node 355B and a "Define Circle" node 355C. The "Set Up For Measurement" node 355A defines and represents settings needed to run the circle tool (i.e., to measure a circle) such as light setting and workstage setting. The "Circle Tool" node 355B represents the circle video tool 330C and includes instructions configured to measure a circle. The "Define Circle" node 355C defines the measured "Circle-5" to thereby conclude operation of the "Measure Circle Circle-5 [,]" instruction representation 355.

Selection of the circle tool 330C from the video tool bar 330 may also be used in conjunction with a command or circle measurement tool that generates a "Measure Circle" window 332, which provides the user with options available in connection with definition of a circle measurement operation. For example, when the user selects a "Run" option 332A to thereby run the "Measure Circle Circle-5 [,]" instruction representation 355 using the edit mode of execution in the learn mode, the vision system may perform the measurement operation starting with the first workpiece feature at location [1,1].

Figure 4C:
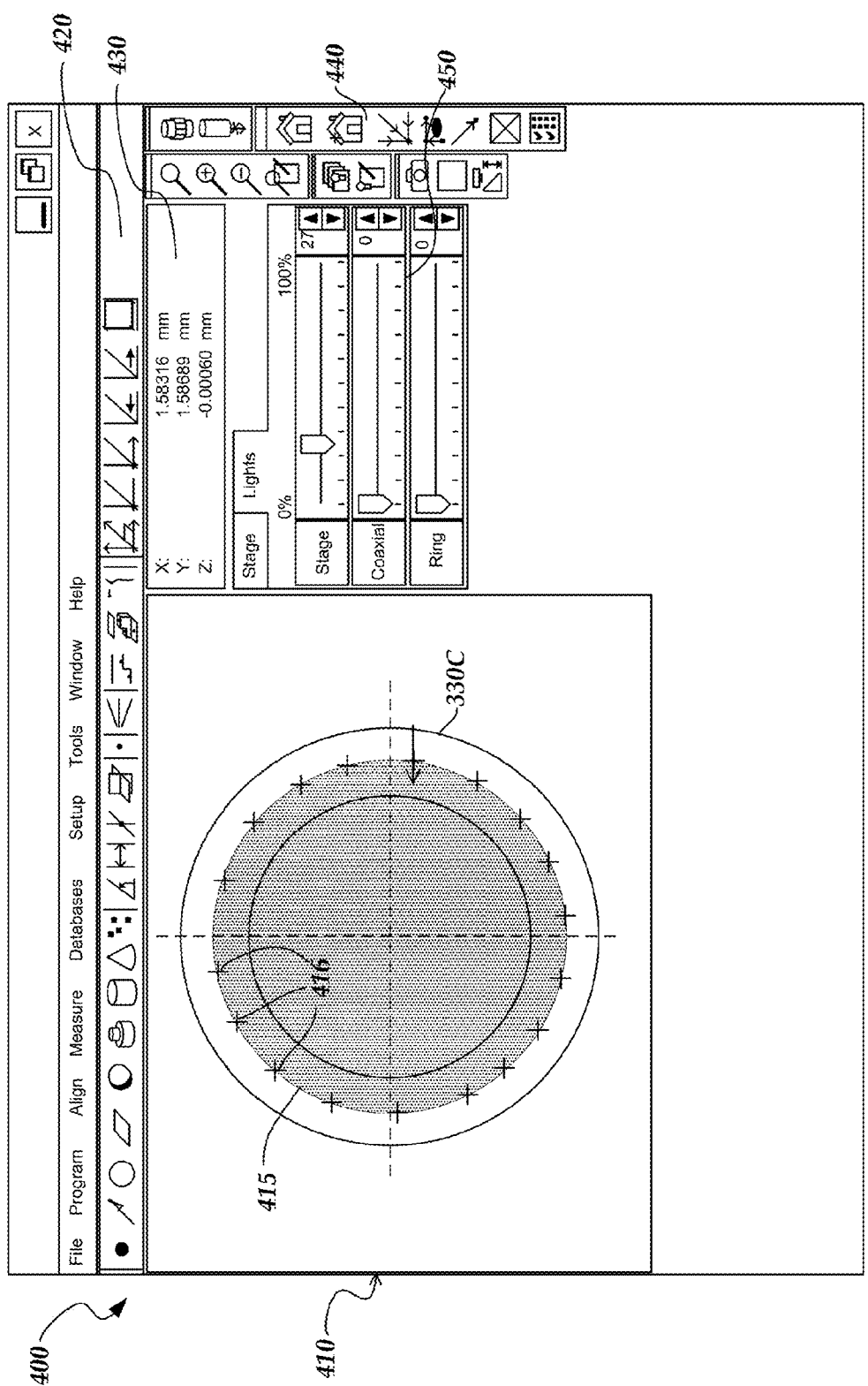
Figure 5B:
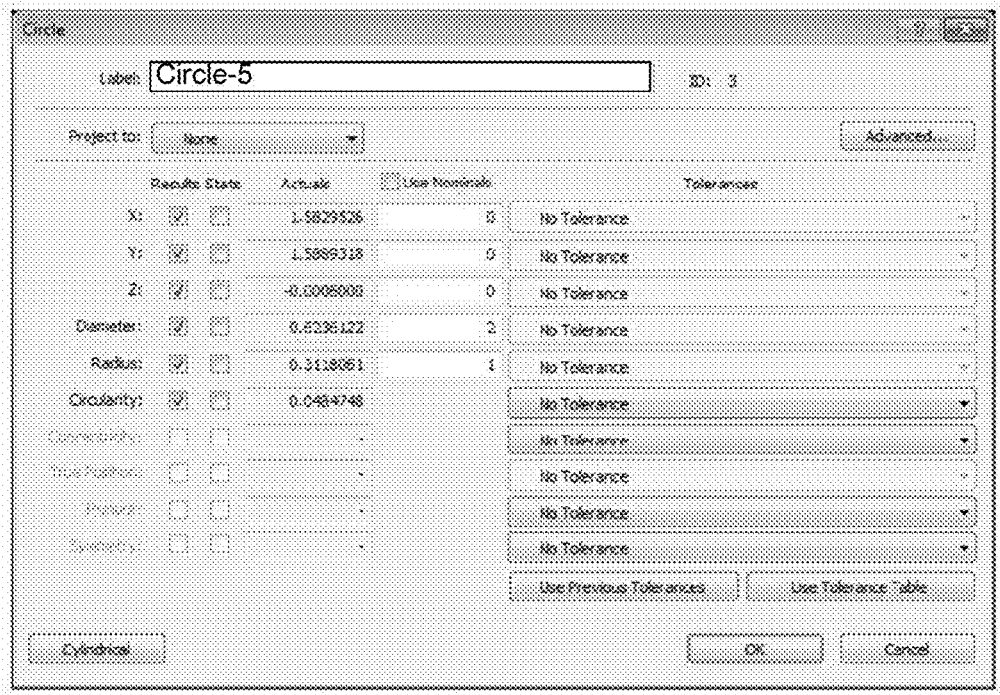

FIG. 4C shows the result of selecting the "Run" option 332A discussed above. Note that the Y position in the coordinate window 430 is now 1.58689 mm, as compared to 0.00241 mm in the window 430 of FIG. 4B, indicating movement of the stage along Y axis by 1.58449 mm. The field of view window 410 shows that eighteen (18) edge points 416 are detected along the edge of the workpiece feature 415 to thereby determine the workpiece feature 415 as a circle, which is also reflected in the "Measure Circle" window 332 of FIG. 3B indicating "18 Points Entered" in 332B. FIG. 5B shows the measurement results of the workpiece feature 415 at location [1,1]. In one embodiment, at least some of the measurement results are saved in XML-like code instructions or XML formatted data structures as surrogate data in association with the "Measure Circle Circle-5 [,]" instruction representation, which may later be recalled and used to generate the needed context for continuing edits of the part program without having to run the entire program.

Figure 3C:
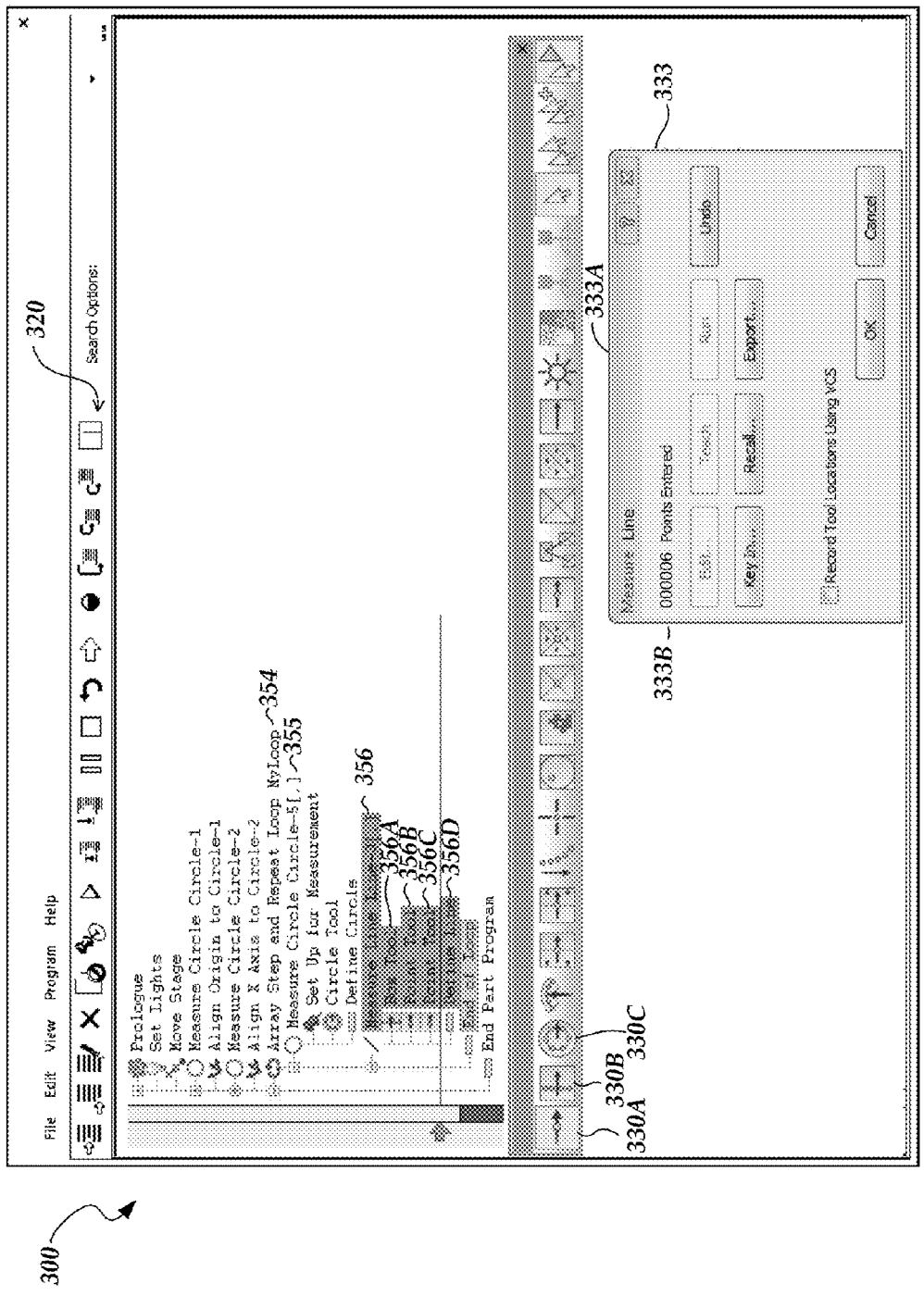

Referring to FIG. 3C, the user may further add a line measurement operation to the repeated operation block, to be repeatedly executed N times on the array of N workpieces or workpiece features as defined in FIG. 5A. Specifically, in the editing interface 300, the video tool bar 330 may be available, from which the user may select the box tool 330B once and the point tool 330A twice and apply them to the image of the workpiece 415 in the field of view window 410 (see FIG. 4D). User selection of the box tool 330B (designed to measure a line) may cause generation of a "Measure Line Line-3 [,]" node 356 as another child node to the parent node of "Array Step and Repeat Loop MyLoop" node 354 in the editing interface 300. (In the "Measure Line Line-3," 3 is used as an identifier of a line to be determined.) The "Measure Line Line-3 [,]" node 356 includes four child nodes: a "Box Tool"

node 356A, a first "Point Tool" 356B, a second "Point Tool" 356C and a "Define Line" node 356D. In one embodiment, the "Box Tool" node 356A and the "Define Line" node 356D are automatically included as a minimum set of child nodes under the "Measure Line Line-3 [,]" node 356 while the two "Point Tools" are manually added by a user. The "Box Tool" node 356A represents the box video tool 330B, which may be used in conjunction with a command or line measurement tool that includes instructions configured to measure a line. The two "Point Tool" nodes 356B, 356C each represent the point video tool 330A and include instructions configured to determine a point. The "Define Line" node 356D defines the "Line-3" as measured by a combination of one box tool 330B and two point tools 330A, to thereby conclude operation of the "Measure Line Line-3 [,]" node 356. Generation of the "Measure Line Line-3 [,]" node 356 may also generate a "Measure Line" window 333, which provides a user with options available in connection with definition of a line measurement operation. For example, when the user selects a "Run" option 333A to thereby run the "Measure Line Line-3 [,]" instruction representation using the edit mode of execution in the learn mode, the vision system measures the workpiece feature at location [1,1] to determine a line.

Figure 4D:
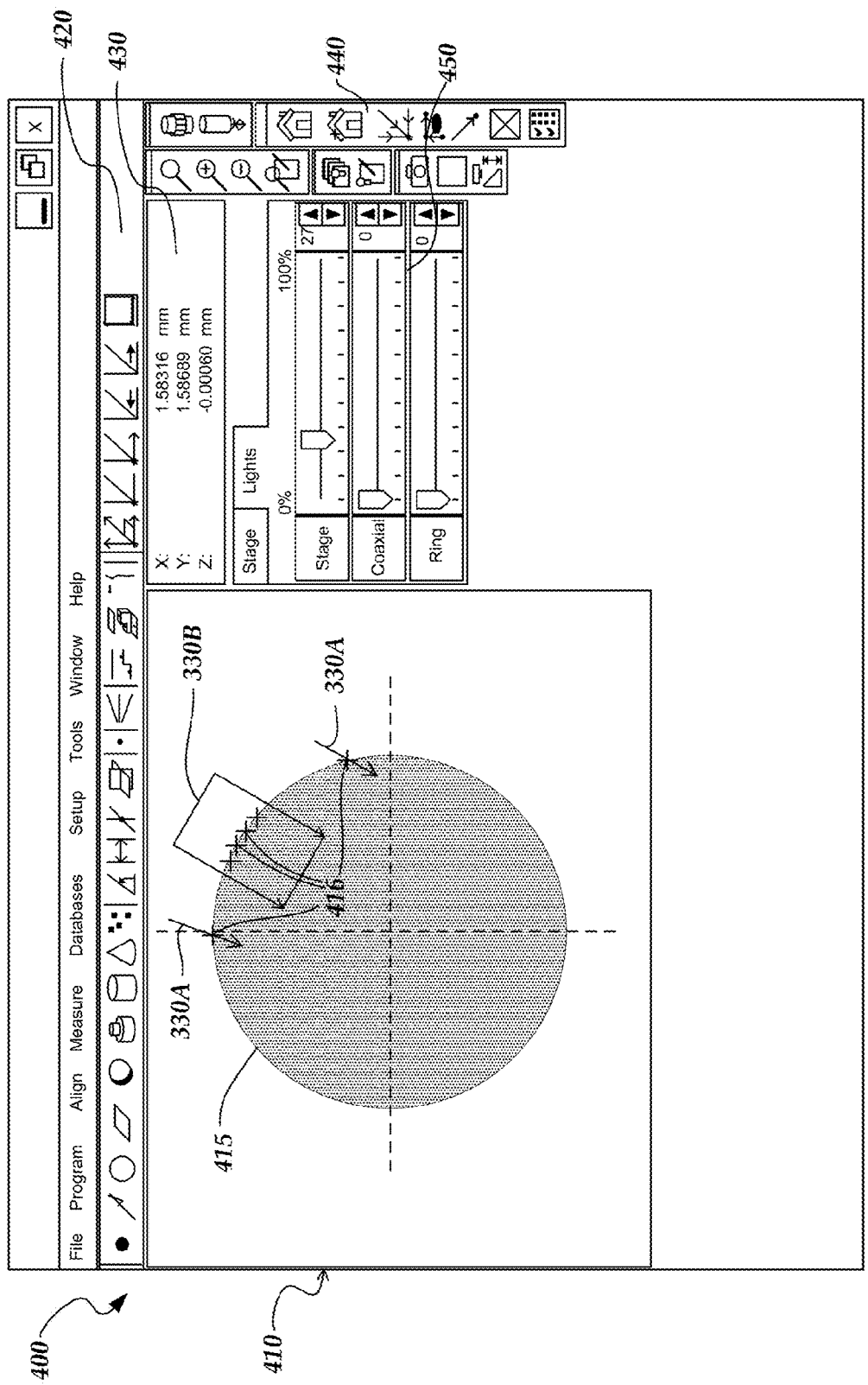
Figure 5C:
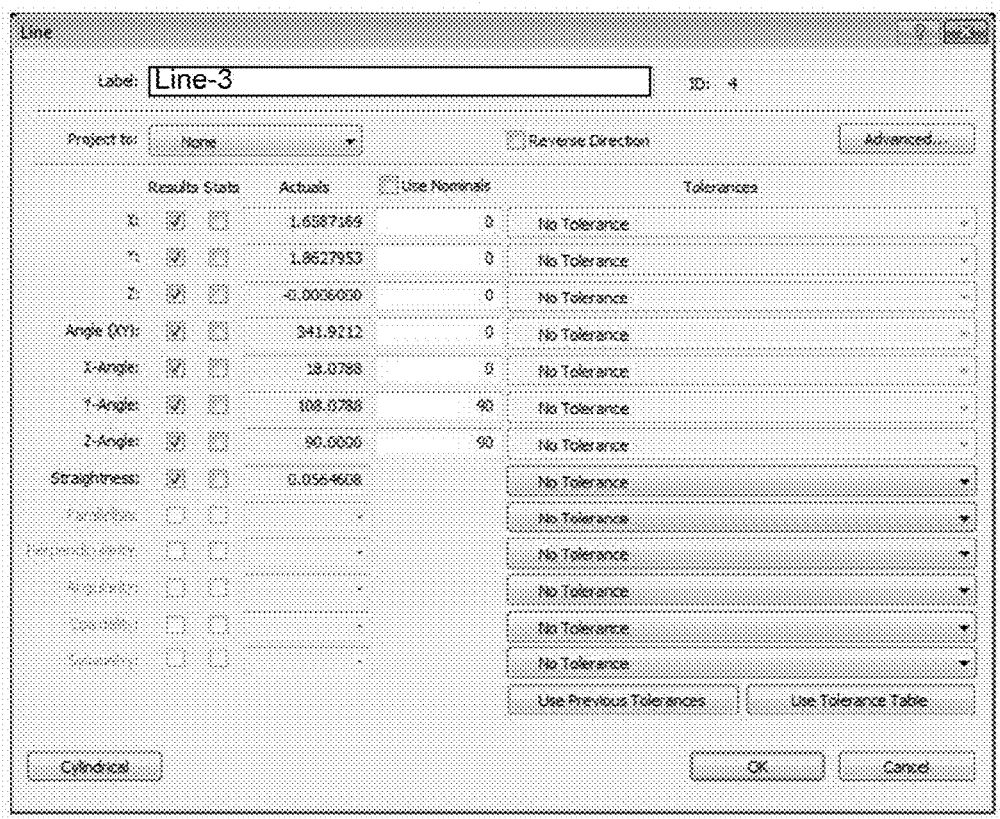

FIG. 4D shows the result of selecting the "Run" option 333A discussed above. The field of view window 410 shows that total six (6) edge points 416 are detected along the edge of the generally circular workpiece feature 415 based on one box tool 330B and two point tools 330A, to thereby determine a line on the workpiece feature 415. This is also reflected in the "Measure Line" window 333 of FIG. 3C, which indicates "6 Points Entered" in 333B. FIG. 5C shows the line measurement results of the workpiece feature 415 at location [1,1]. In one embodiment, at least some of the measurement results are saved in the XML-like code instructions or data structures as surrogate data in association with the Box Tool and/or the associated "Measure Line Line-3 [,]" instruction representation, which may later be recalled and used to generate the right context for continuing edits of the part program without having to run the entire program.

When the Array Step and Repeat Loop MyLoop 354 as defined above is fully executed, the circle and line measurement results will be obtained for each of the 6 workpiece features in the 2×3 array as defined in FIG. 5A. FIG. 5D illustrates one example of the measuring results, in which only the measuring results for locations [2,2] and [2,3] are shown in a "Measurement Results" window 512, though the measurement results for other locations [1,1], [1,2], [1,3], [2,1] may be accessed by scrolling up the window 512.

Generation of a repeated operation block of inspection operations to be executed N times at N locations in an array of workpiece features (i.e., the "Array Step and Repeat Loop MyLoop" node 354 in the illustrated example) is now complete.

Figure 3D:
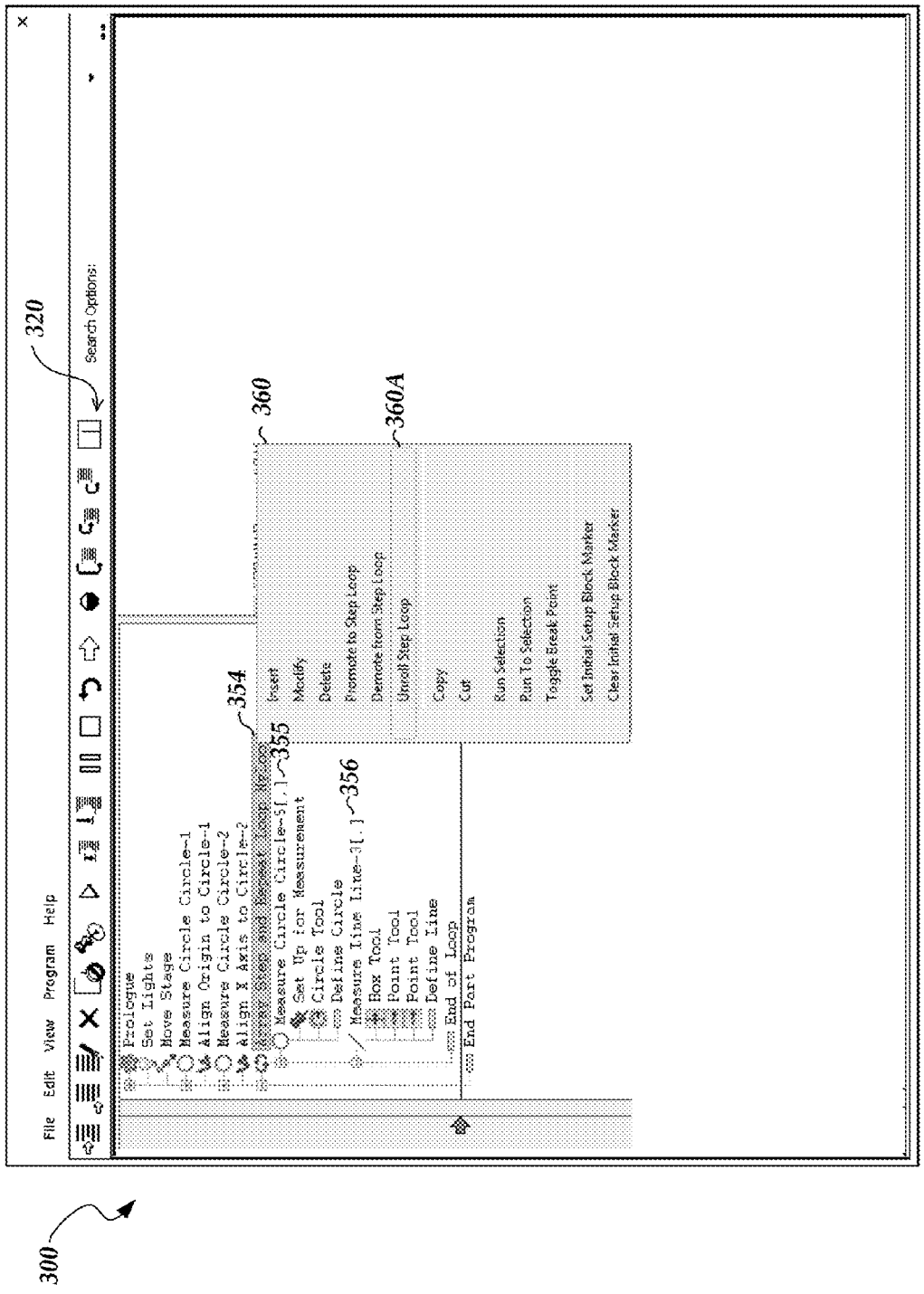

Referring now to FIG. 3D, according to various embodiments of the invention, a user may convert a defined step and repeat loop programming element to generate N independently-editable code blocks each including an independently-editable substantial replication of the inspection instructions defined in its repeated operation block, each of the independently-editable code blocks to be executed at a respective location corresponding to one of its N defined locations. In one embodiment, when a representation of a defined step-and-repeat programming element is displayed in the editing interface portion of the GUI, the user may select that representation (e.g. placing a cursor over the "Array Step and Repeat Loop MyLoop" node 354 on the editing interface 300), and/or right click on the selected representation, and a menu window 360 may appear including various options/selections directed to the selected representation, such as an "Unroll Step Loop" command option 360A, which is one embodiment of a conversion command including various operations as disclosed herein. When the user selects and/or executes the "Unroll Step Loop" command option 360A, the step and repeat loop converter 173 in the control system portion 120 (see FIG. 2A) executes operations of that command that automatically replicate the inspection instructions defined in the repeated operation block of the selected step-and-repeat programming element to generate N independently-editable code blocks each including an independently-editable substantial replication of the inspection instructions defined in the repeated operation block, each of the independently-editable code blocks to be executed at a respective location corresponding to one of the N defined locations. In various embodiments, the step and repeat loop converter 173 also executes operations of that command that automatically provide a representation of the N independently-editable code blocks in the editing interface portion of the GUI, each of the N code block representations including an editable representation of the inspection instructions included in its replicated instance of the repeated operation block. In various embodiments, the step and repeat loop converter 173 also executes operations of that command that eliminate the defined step-and-repeat programming element as an element in the part program, and as an editable element in the editing interface portion of the GUI. In some embodiments, this may comprise deactivating the step-and-repeat programming element as an editable element and/or indicating its deactivation with a predetermined color, or cursor state, or strikethrough or the like, until the part program is saved with the step-and-repeat programming element and its associated instructions completely deleted. In other embodiments, the step-and-repeat programming element (e.g. the instruction representations included in Array Step and Repeat Loop MyLoop" node 354 on the editing interface 300) may be immediately deleted, along with its associated underlying code.

It should be appreciated that in contrast to known step and repeat "unroll" operations as may be performed in a compiler or the like, which may expand a step and repeat loop into explicitly coded loop iterations for the purpose of faster machine execution of the code, the step and repeat loop conversion command disclosed herein is available in a GUI to be operated by choice by a relatively unskilled user (e.g. for the purpose of editing, augmenting, replacing, or deleting operations at individual locations). In contrast to known "unroll" operations, the conversion command operations disclosed herein may completely eliminate a step-and-repeat programming element and automatically replace it with a more flexible group of instructions which allow the user to perform editing adjustments to the instructions with respect to a particular one or more of the features to be inspected, which would otherwise be individually inaccessible in the original step and repeat loop element.

Figure 3E:
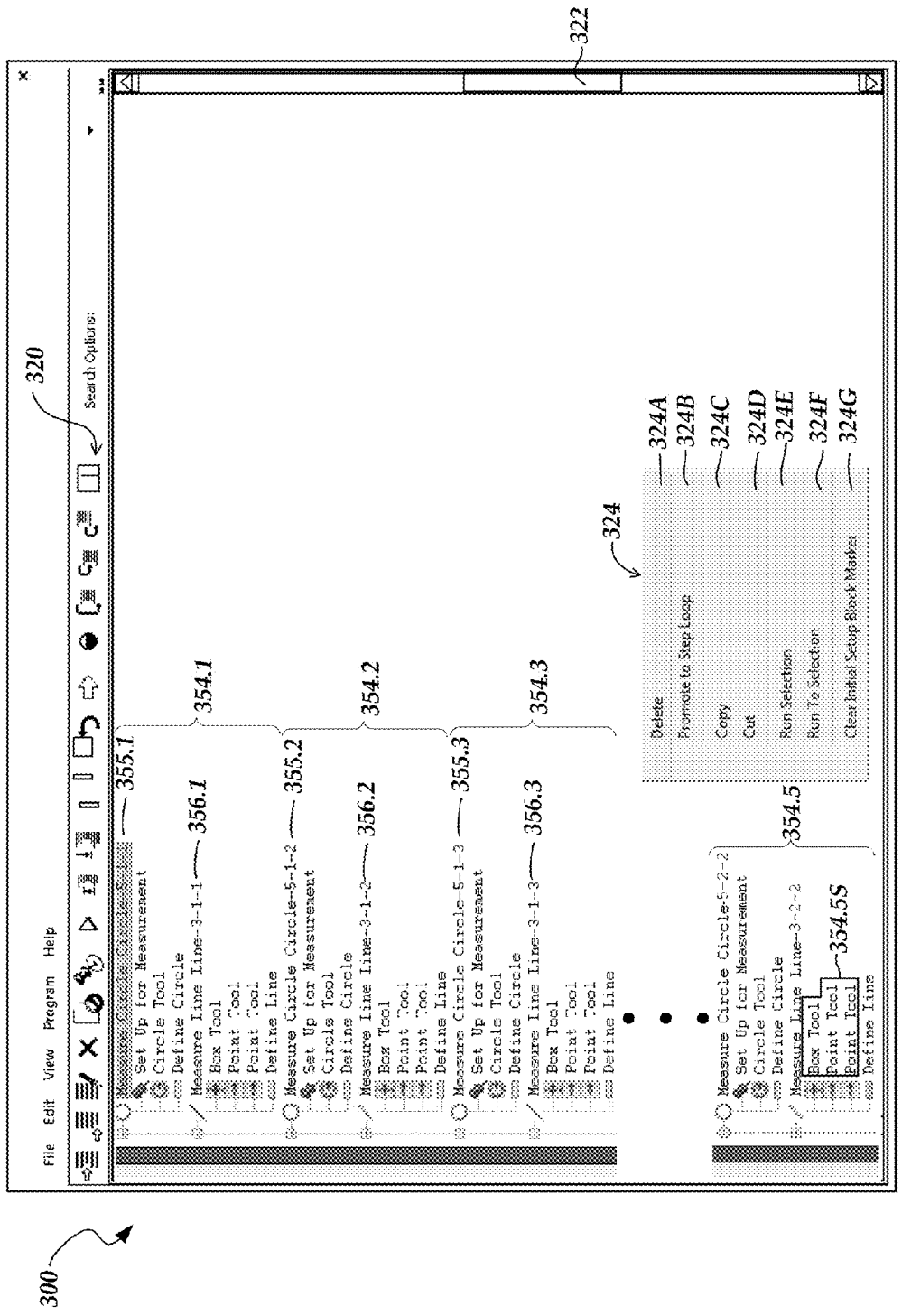

FIG. 3E shows the editing interface 300 displaying the "Array Step and Repeat Loop MyLoop 354" converted into and/or replaced by six instances 354.1~354.6 of independently-editable instructions sets contained in six blocks, to be executed on six workpiece features at respective locations corresponding to the locations [1,1], [1,2], [1,3] and [2,1], [2,2], [2,3] as defined in FIG. 5A above. In FIG. 3E, due to limited space, only the instances 354.1, 354.2, 354.3 and 354.5 are shown, though in actual implementations the user may readily view and access each and every instance by using a scroll bar 322 to scroll up and down the editing interface 300. Note that each instance is a discrete, independently-editable instance of the basic set of step-and-repeat instruction representation. In other words, each instance 354.1~354.6 includes a substantial replication of the "Measure Circle Circle-5" node including three child nodes, and the "Measure Line Line-3" node including four child nodes, as the repeated operation block of the "Array Step and Repeat Loop MyLoop" 354 as originally defined. But each instance is given a unique name or unique names, and other representation and/or code support elements may be added as need such that each instance is independently identifiable, editable, and manageable (e.g. according to various context and synchronization and display features as described elsewhere herein.) As a result, in accordance with various exemplary embodiments, any modification or editing made to any one of the instances does not affect, or modify, other instances that are not modified or edited. Specifically, in the illustrated embodiment, the first instance of the basic set of step-and-repeat instructions is given the names of "Measure Circle Circle-5-1-1" and "Measure Line Line-3-1-1" to uniquely indicate that the instance 354.1 is to be executed on a workpiece positioned at location [1,1] of FIG. 5A. Similarly, the second instance of the basic set of instructions is given the name of "Measure Circle Circle-5-1-2" and "Measure Line Line-3-1-2" to uniquely indicate that the instance 354.2 is to be executed on a workpiece positioned at location [1,2] of FIG. 5A, and so on.

Referring back to FIG. 3E, when a user wishes to edit one instance of the independently editable instructions sets, the user may place a cursor over the representation of that instance (and in some embodiments then "right click"), which may cause a drop down menu 324 to appear in the editing interface 300 for performing certain edit mode commands or functions. In other embodiments, the drop down commands may alternatively be accessed through menu choices associated with tool bars or tabs that are consistently displayed in the GUI. In this embodiment, the drop down menu 324 in the illustrated example includes options such as a delete 324A, a promote to step loop 324B that will promote the selected instance to contain its own internal step-and-repeat instructions, a copy 324C, a cut 324D, a run selection 324E that will run the code corresponding to the selected instance using actual data and/or surrogate data, a run to selection 324F that will run the code corresponding to a part program including the step-and-repeat instructions up to (prior to) the selected instance using actual data and/or surrogate data, and a clear initial setup block marker 324G that will clear an initial setup block marker for the selected instance.

In one embodiment, the drop down menu 324 may be provided when a user selects certain instruction representation(s), for example by using a mouse to move a selector (cursor) over the instruction representation(s) and/or by right-clicking on it. The instruction representation(s) that are selected to be edited (e.g. instruction representations 354.5S) may be indicated by a selector box, as shown in FIG. 3E, or by highlighting or by other indicator method. In some embodiments, the drop down menu 324 may be customized depending on whether the user selects one instruction representation or multiple instruction representations. In the example of FIG. 3E, the user has selected three instruction representations (in three lines) 354.5S, and thus the drop down menu 324 includes various edit mode commands or functions applicable to multiple instruction representations at once. On the other hand, when a single instruction representation is selected, another type of drop down menu may appear that includes various edit mode commands or functions applicable to a single instruction representation, such as "insert" (to insert a new instruction representation above the selected instruction representation) or "modify" to modify the selected instruction representation.

Figure 3F:
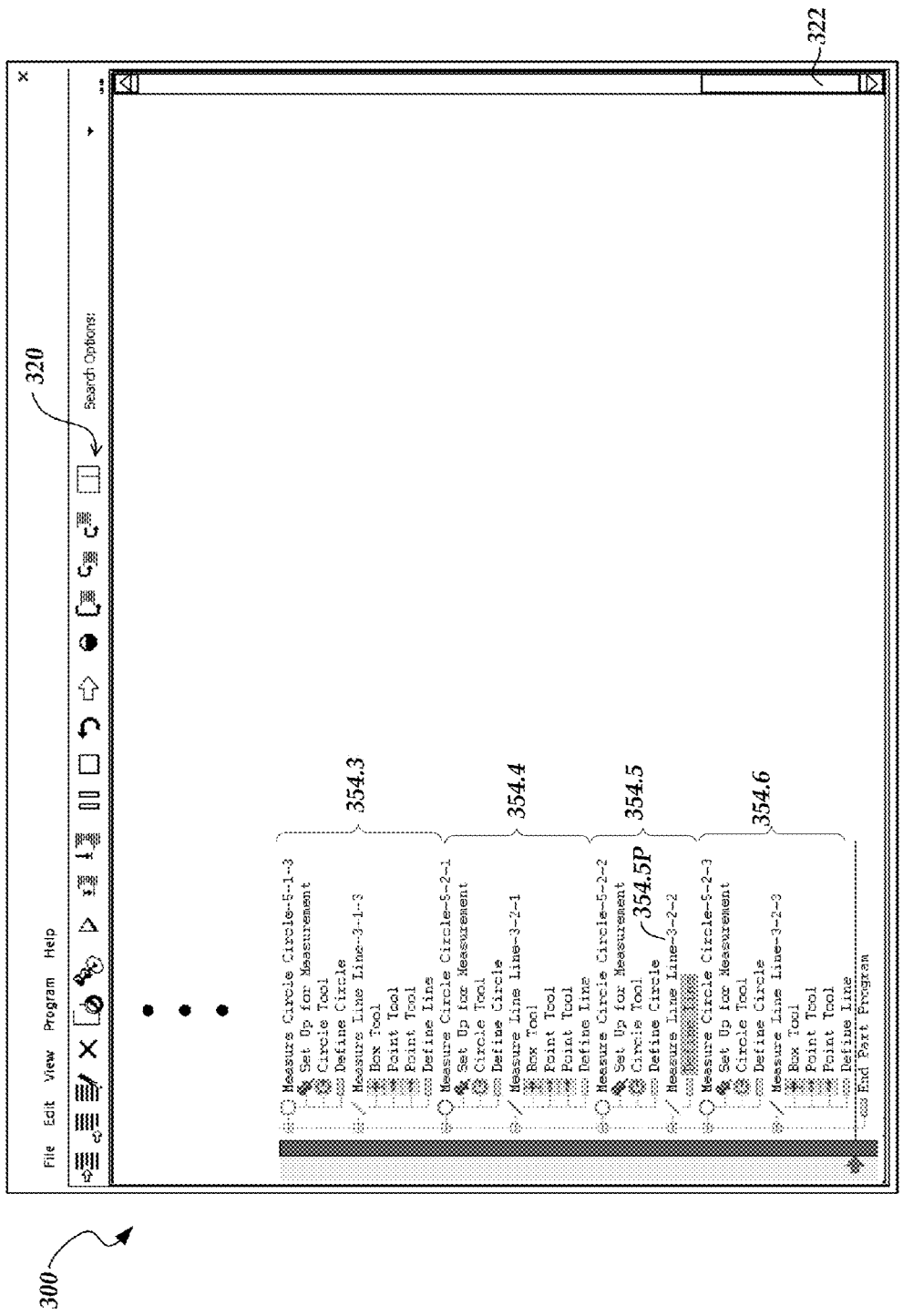

Still referring to FIG. 3E, when the user selects the "delete" option 324A from the drop down menu 324, the selected instruction representations 354.5S consisting of one Box Tool and two Point Tools under the parent node of "Measure Line Line-3-2-2" are caused to be deleted, as shown in FIG. 3F. Specifically, FIG. 3F shows the parent node of "Measure Line Line-3-2-2" 354.5P, which is now empty and includes only the concluding "Define Line" child node. Thus, at this time, the independently-editable instance 354.5 of the instructions to be applied to a workpiece feature at location [2,2] is made shorter than each of the rest of the instances 354.3, 354.4 and 354.6 displayed in the editing interface 300. As in FIG. 3E, though only four independently editable instances 354.3, 354.4, 354.5 and 354.6 are shown, the user can readily view and access all six instances by using the scroll bar 322 for the editing interface 300.

Figure 3G:
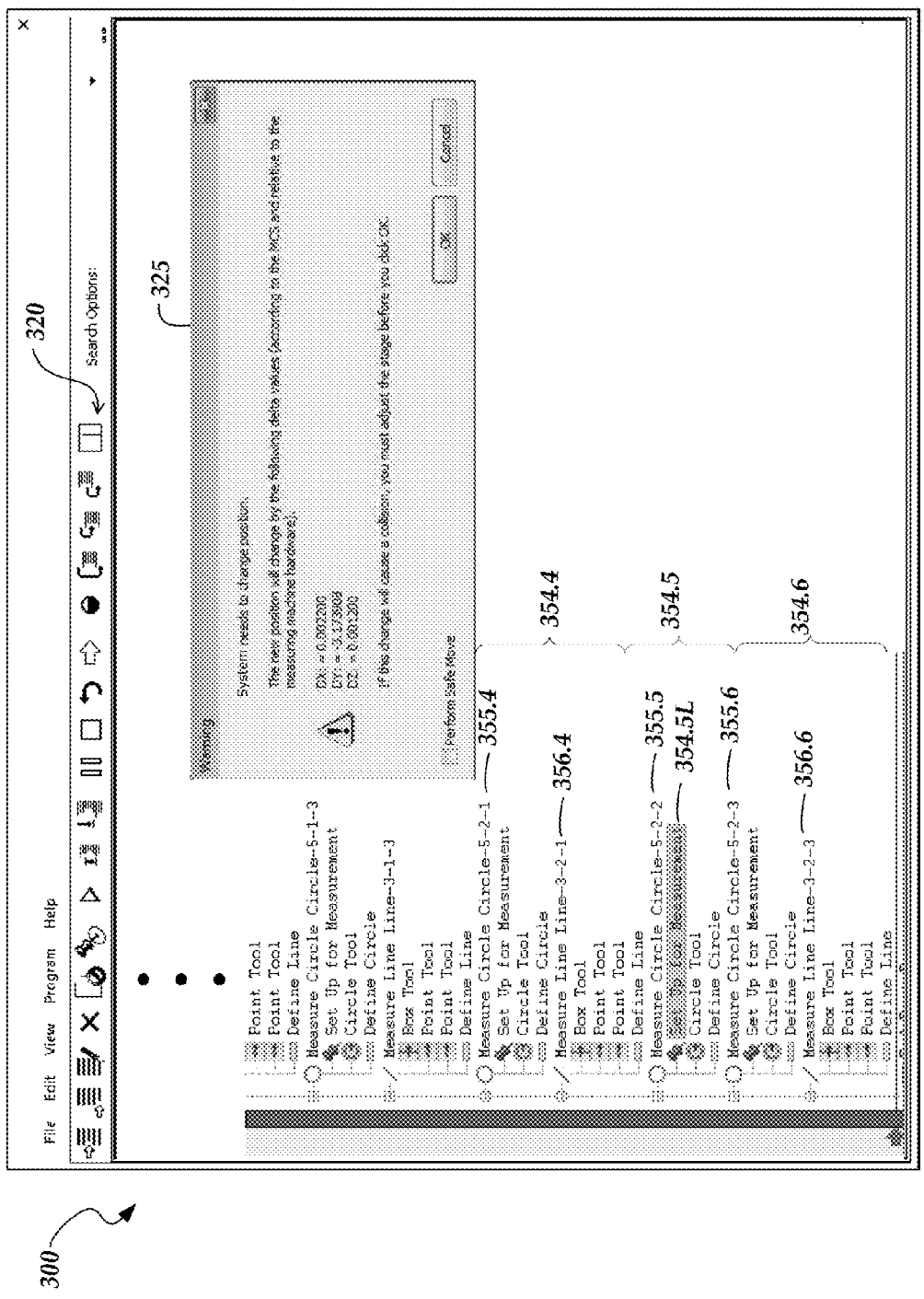

Referring to FIG. 3F, at this point, the user may select the empty node "Measure Line Line-3-2-2" 354.5P by, for example, placing a cursor over it (and right-clicking on it), which may again cause the drop down menu 324 to appear, from which the user may again select the "delete" option 324A to delete the node 354.5P including one remaining child node "Delete Line," as shown deleted in FIG. 3G. Specifically, FIG. 3G shows that the instance 354.5 to be executed on a workpiece feature at location [2,2] consists only of the "Measure Circle Circle-5-2-2" instruction representation, and the "Measure Line Line-3-2-2" instruction representation has been completely deleted. In one embodiment, if a parent node is selected and deleted, all child nodes and grand-child nodes that depend from the parent node may also be deleted, while if a child node is selected and deleted, its parent node remains and is not automatically deleted, as in the example illustrated in FIGS. 3E-3G above.

Referring to FIG. 3G, the user continues with independent editing of instances of the basic set of step-and-repeat instructions as shown in the editing interface 300. At this time, the user wishes to modify the light setting to be applied in execution of the "Measure Circle Circle-5-2-2" node remaining in the instance 354.5, from which the "Measure Line Line-3-2-2" node has been deleted. Thus, the user selects the "Set Up For Measurement" child node 354.5L under the parent node of the "Measure Circle Circle-5-2-2." As shown in FIG. 3G, each of the displayed instances 354.3, 354.4, 354.5 and 354.6 of the set of instructions starts, right under the parent node of "Measure Circle Circle-5-x-x," with a child node of "Set Up For Measurement" which defines the initial workstage position and light setting. In one embodiment, when the basic set of step-and-repeat instructions was unrolled to generate multiple instances of independently-editable instruction sets, each instance is configured to include a copy of the "Set Up For Measurement" instruction representation and its corresponding code configured for the basic set of step-and-repeat instructions. Thus, in this case, because the lighting was originally set to use a stage light (220 in FIG. 2A) at the intensity level of 27% as shown in the light control window 450 of FIG. 4A, the "Set Up For Measurement" instruction representation 354.5L of the instance 354.5 also initially defines use of the stage light at the intensity level of 27%.

In one embodiment, user selection of the "Set Up For Measurement" node 354.5L under the parent node of "Measure Circle Circle-5-2-2" may cause a warning window 325 to appear to warn the user that the machine vision inspection system 100 needs to move the workpiece stage 210. The warning is defined to prompt the user, if the position change will cause a collision, to adjust the stage before clicking "OK"

in the window 325. Specifically, because the "Set Up For Measurement" node defines the workstage position and light setting, in various implementations, modifying/editing the workstage position or light setting need to be carried out in the right "hardware" context (such as the correct initial stage position, light levels, magnification, etc.) as well as in the right "software" context (such as the previous measurements already made, a coordinate system being utilized, etc.). In other words, due to the very nature of a part program that it must control operations of a vision machine in the right context, editing of a part program also must be done in the right context in various embodiments. In the illustrated example, the vision machine, or specifically, the workstage may need to be physically moved, as indicated in the warning window 325, to generate the right context that permits the user to edit the "Set Up For Measurement" node 354.5L to be applied to a workpiece feature positioned at location [2,2].

Figure 3H:
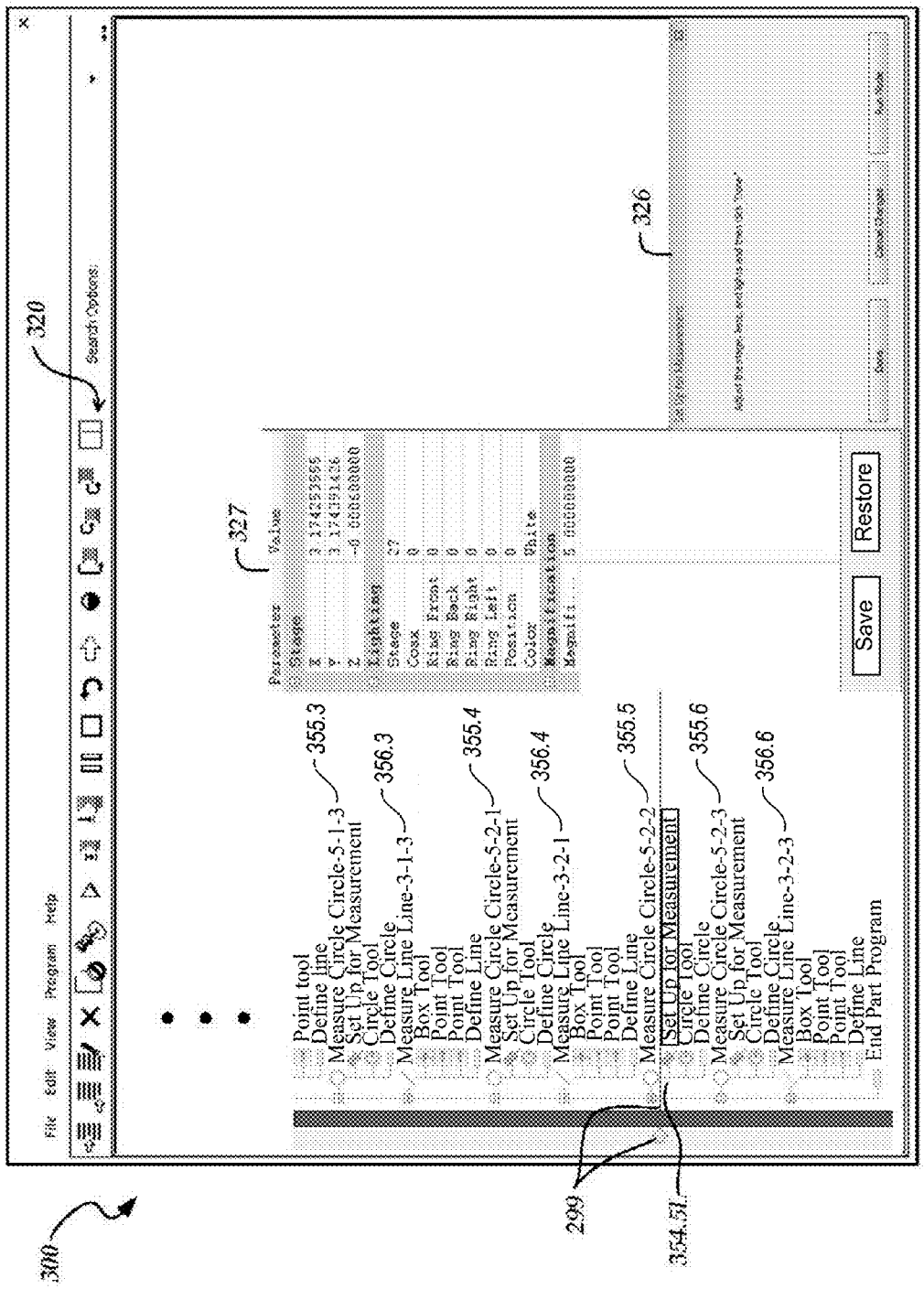
Figure 4E:
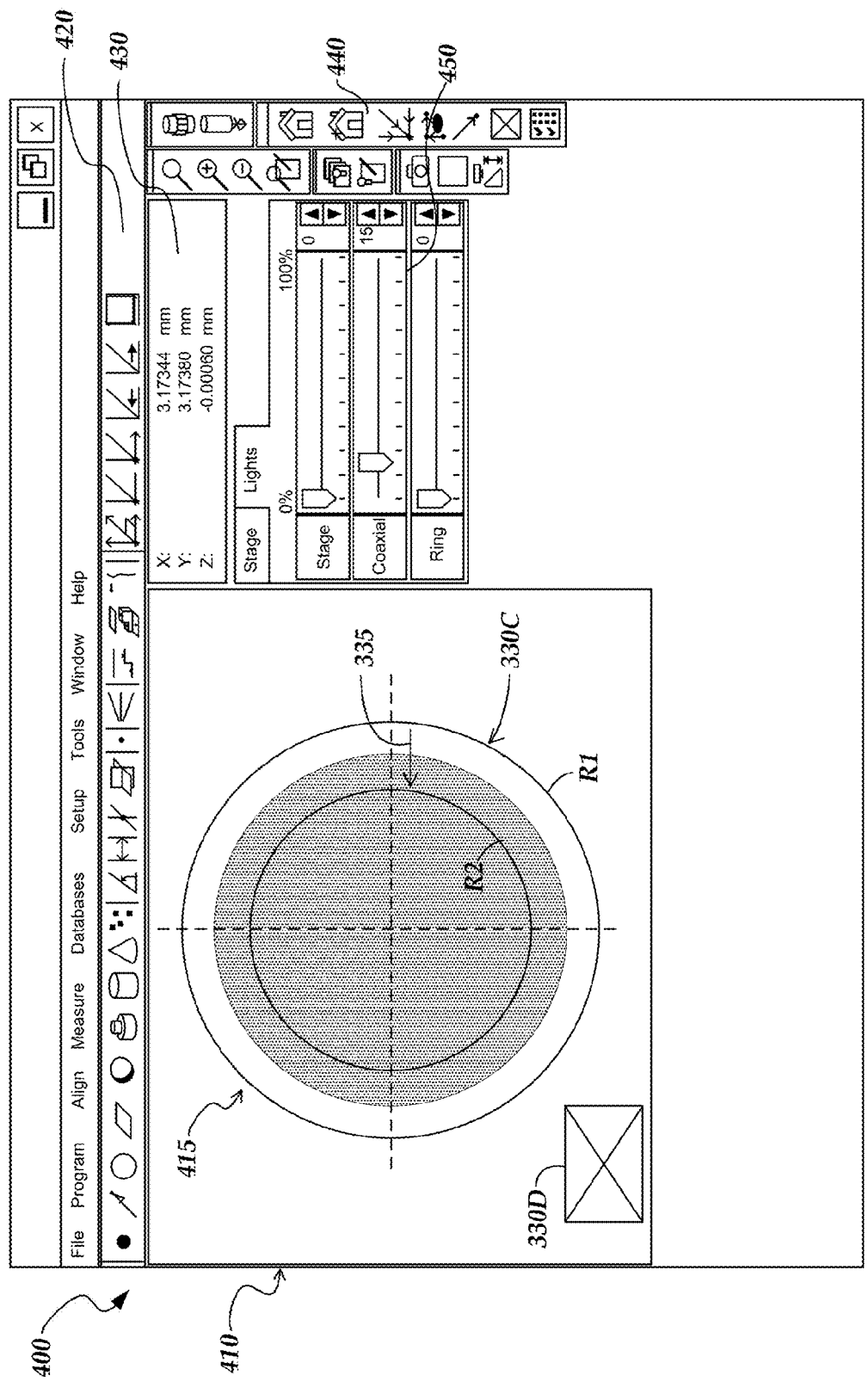

After the user clicks "OK" on the warning window 325 of FIG. 3G, as shown in FIG. 3H, the user may be prompted by a "Set Up Measurement" window 326 to "adjust the stage, lens, and lights and then click 'Done'." At this time, a parameter window 327 may also appear in the editing interface 300, to indicate the current parameter values related to the stage X-Y-Z position, the lighting, and the magnification. In one embodiment, the user may directly change the parameter values in the parameter window 327 to effect a desired change. In other embodiments, the user may manually change the workstage position and the magnification on the machine vision system, via a suitable control panel interface for example. In the illustrated example of FIG. 4E, the user may control the sliding bars in the light control window 450 to effect a desired change for the lights. FIG. 4E shows that the user has changed the stage light intensity level from 27% to 0% and changed the coaxial light (230 in FIG. 2A) intensity level from 0% to 15%. Thus, the light setting in the "Set Up For Measurement" node 354.5L (FIG. 3H) in the instance 354.5 of instructions to be executed on a workpiece at location [2,2] is now changed from the stage light at 27% to the coaxial light at 15%. In various embodiments, changes and modifications made in various windows and control panels such as the parameter window 327 and the light control window 450, once recorded, are automatically reflected in the corresponding areas of the editing interfaced 300 including the corresponding instruction representation (the "Set Up For Measurement" node 354.5L in the illustrated example) and the corresponding computer-executable code instruction.

In some embodiments, as shown in FIG. 3H, a visual delineator 299 such as an arrow and/or a line may be included in the editing interface 300 to indicate an instruction representation (or a node) that is being edited. In the example of FIG. 3H, the visual delineator 299 indicates that the "Set Up for Measurement" node 354.5L of the instance 354.5 is being edited or has been edited.

Figure 3I:
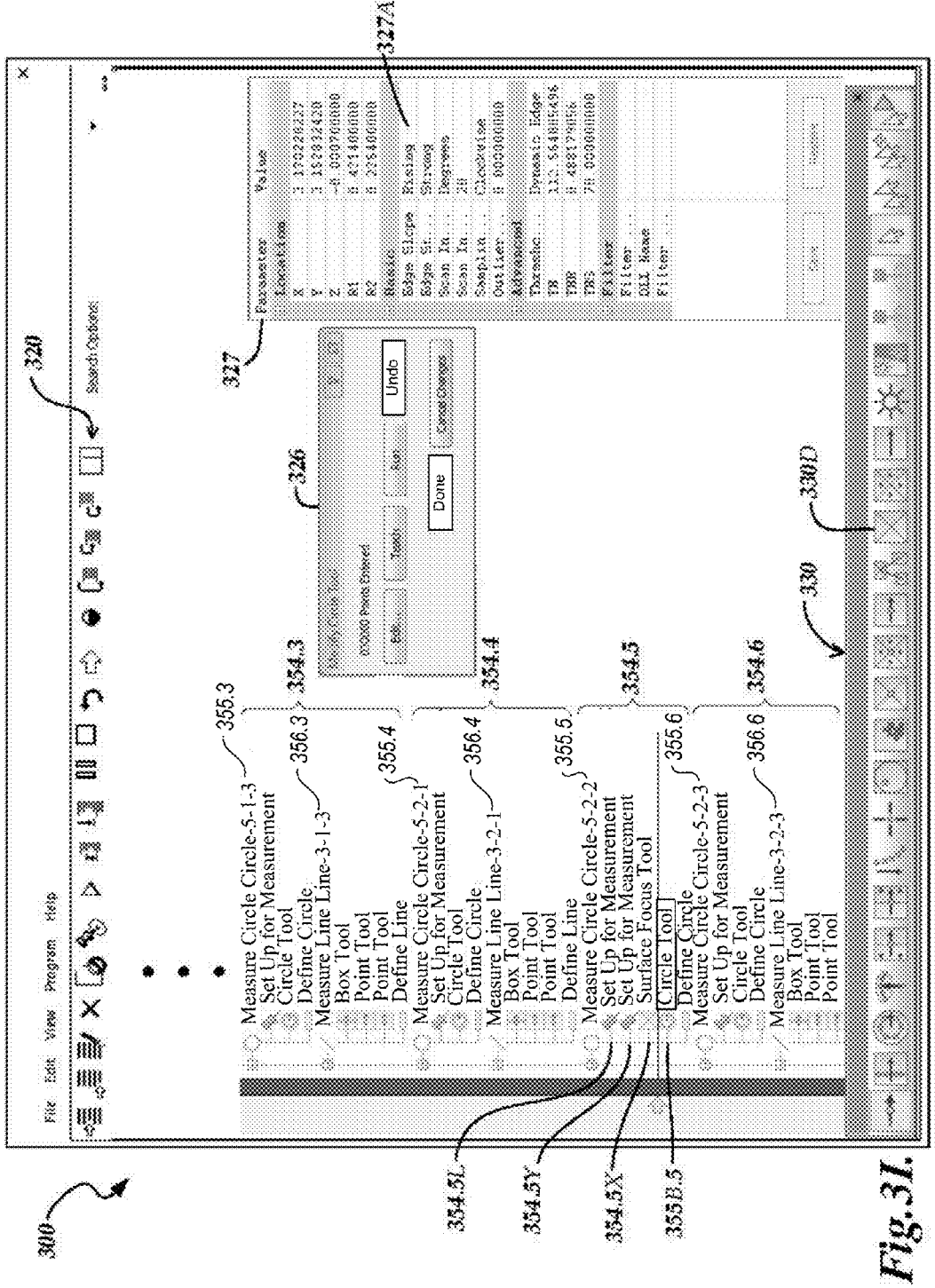

Next, as a further example of editing one instance of the converted instructions independently of other instances, assume that the user now wishes to add a video tool to alter the set up in the "Measure Circle Circle-5-2-2" node of the instance 354.5. In one implementation, user selection of the "Measure Circle Circle-5-2-2" node in the editing interface 300 causes the video tool bar 330 including various icons representing video tools to appear, as in the original definition of the basic set of repeat-and-step instructions described above in reference to FIGS. 3B and 3C. Specifically, as shown in FIG. 3I, the video tool bar 330 may appear when the user places a cursor over the "Measure Circle Circle-5-2-2" node to be edited in the editing interface 300, or may appear when a user explicitly selects a radio button that causes the tool bar 330 to appear. From the tool bar 330, the user selects any of the video tools included therein and, in the illustrated example, has selected to use a surface focus tool 330D. Briefly, the surface focus tool is configured to auto-focus on a surface region of interest for the purpose of more precisely focusing at that region of interest. Operations and use of the surface focus tool are known in the art and described in detail in the incorporated references. FIG. 4E shows the user selection and application of the surface focus tool 330D on a workpiece 415 in the field of view window 410 of the image interface 400. In the illustrated example, the user has selected the surface focus tool 330D to be run in connection with set up for the "Circle Tool" node 355B.5 of the instance 354.5 of instructions to be applied to a workpiece feature at location [2,2]. Thus, as illustrated in FIG. 3I, when a user places a cursor on the "Circle Tool" node 355B.5 in the editing interface 300 and selects the surface focus tool 330D to be added from the video tool bar 330, a "Surface Focus Tool" node 354.5X is inserted above the "Circle Tool" node 355B.5 in the instance 354.5. In the illustrated embodiment, a new "Set Up For Measurement" node 354.5Y is also added together with the new "Surface Focus Tool" node 354.5X by default, which in some embodiments is a copy of the "Setup for Measurement" node 354.5L for the "Measurement Circle Circle-5-2-2" parent node, because proper operation of any video tool requires proper Set Up For Measurement. In other embodiments, a new "Set Up For Measurement" node 354.5Y need not be added because the "Set Up For Measurement" node 354.5L for the "Measurement Circle Circle-5-2-2" parent node already exists as in the present example.

After adding the "Surface Focus Tool" node 354.5X in the instance 354.5 for a workpiece feature at location [2,2], the user may then start editing the succeeding "Circle Tool" node 355B.5 to be run subsequent to the surface focus tool. To that end, the user may select the "Circle Tool" node 355B.5 in the editing interface 300, which may cause a "Modify Circle Tool" window 326 to appear as well as the parameter window 327 that shows parameter values currently defined for the "Circle Tool" 355B.5. One of the parameters included in the parameter window 327 is a "Edge Slope" parameter 327A, which by default is set "Rising" to indicate that a circle is to be determined by detecting an edge with a rising slope when the vision system scans an image from a first circle R1 to a second circle R2 in the direction of an arrow 335, as illustrated in FIG. 4E. Thus, the "Circle Tool" node 355B.5 is defined to detect a bossed circular area on a surface. In one embodiment, the user selects an "Edit" option in the "Modify Circle Tool" window 326 and is allowed to modify and edit any of the parameters listed in the parameter window 327.

Figure 4F:
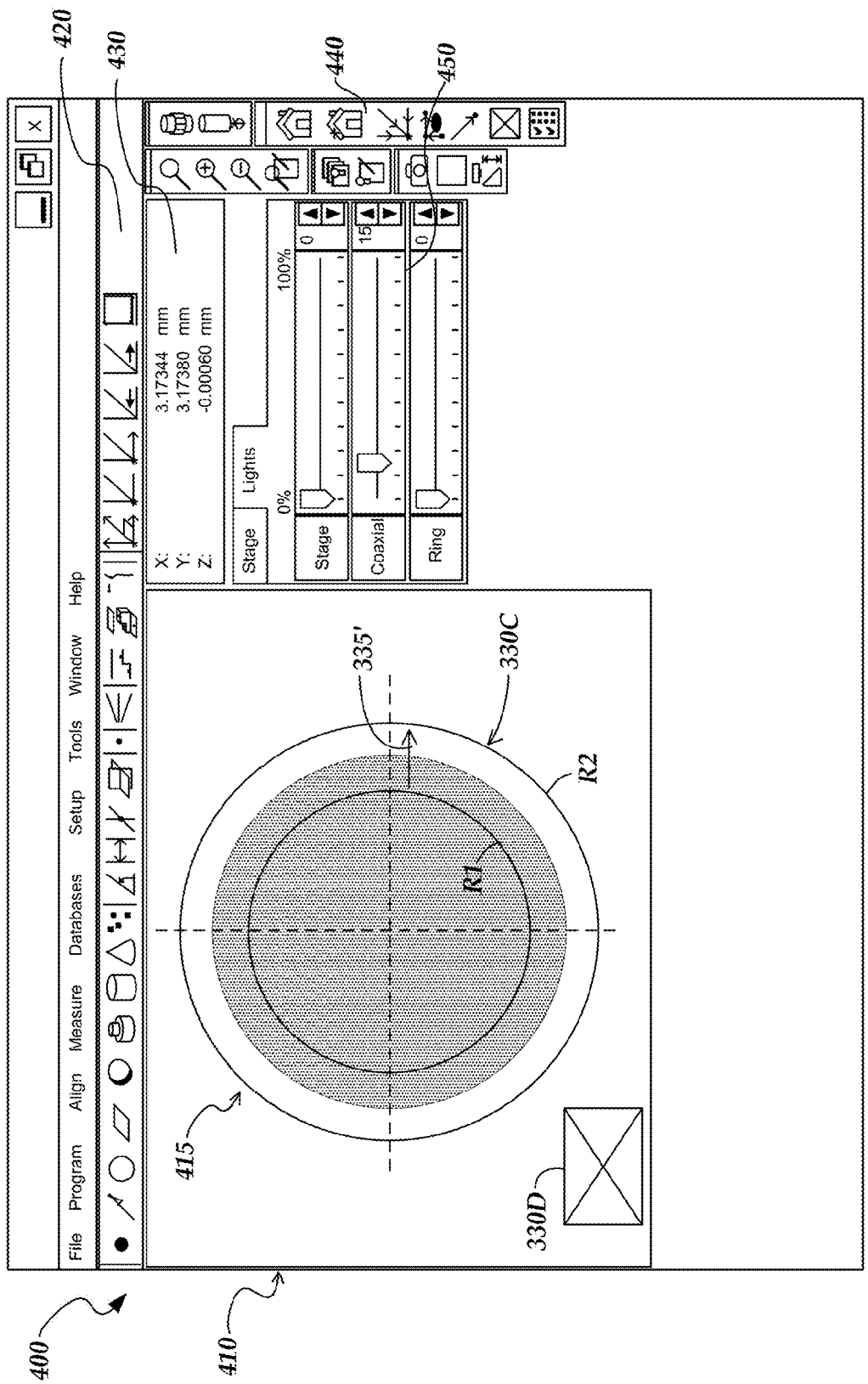
Figures 5E, 5F, 5G, 5H:
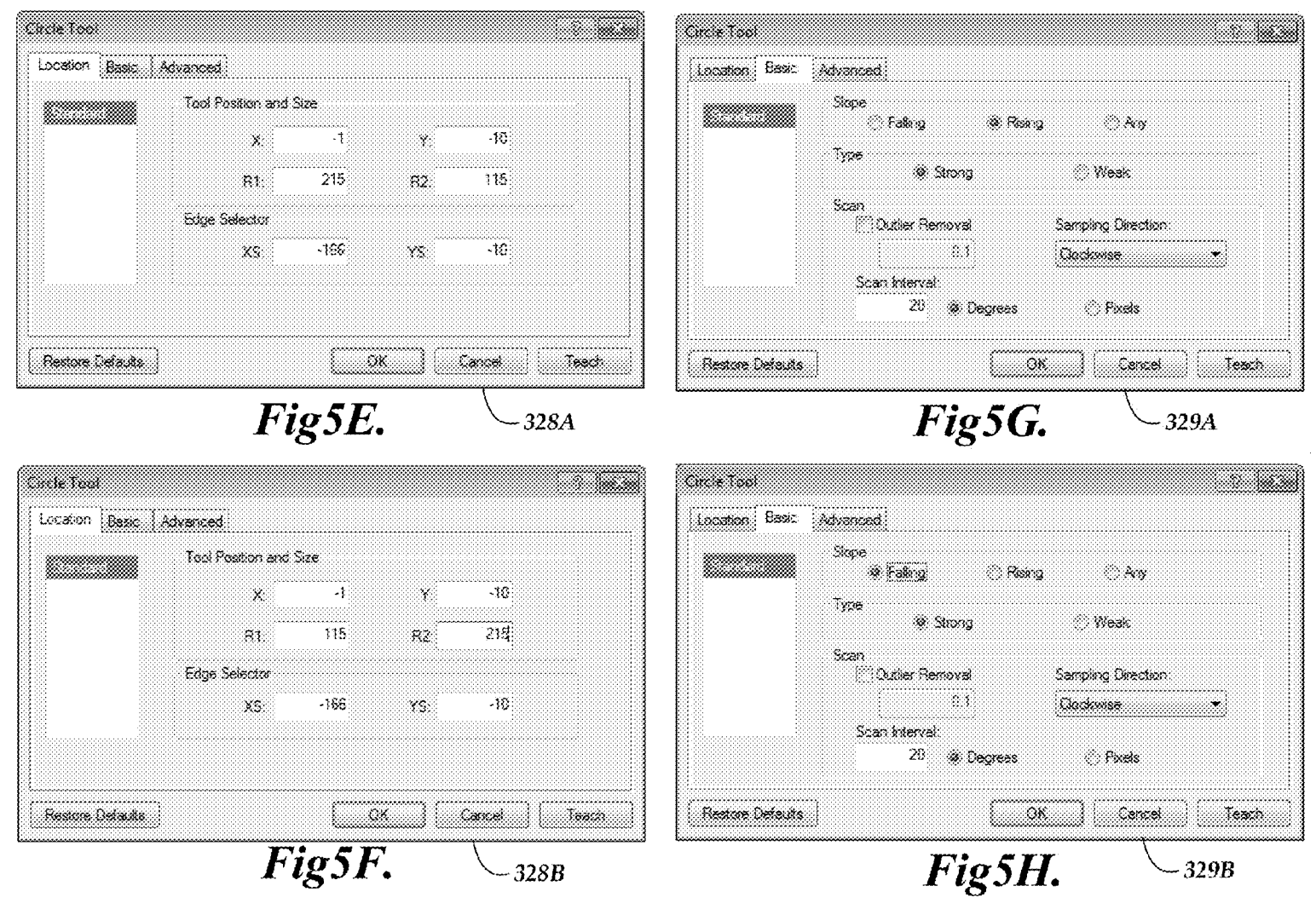

In one embodiment, the user may edit/modify the parameters directly in the parameter window 327. In other embodiments, as shown in FIGS. 5E-5H, "Circle Tool" parameter editing windows 328 and 329 are generated in the editing interface 300 upon user selection of the "Edit" option in the "Modify Circle Tool" window 326. Referring to FIG. 5E, a first parameter editing window 328A shows the current parameter values set for the circle tool. FIG. 5F shows the same first parameter editing window 328B, but in which the user has modified the values of "R1" and "R2" (see 340A) from those in FIG. 5E to change the direction of scan. Specifically, as shown in FIG. 4F, the direction of scan to determine a circle is now set to occur from a smaller circle with R1 to a larger circle with R2 in the direction of an arrow 335', which is opposite to the scan direction used in FIG. 4E. In one embodiment, when the user selects "OK" in the first parameter editing window 328B to accept the result of the modification, a second parameter editing window 329A will appear, as shown in FIG. 5G, which includes a further set of the current parameter values that are set for the circle tool. FIG. 5H shows the same second parameter editing window 329B, but in which the user has modified the "Slope" parameter (see 340B) from "Rising" to "Falling." As a result, the circle tool is configured to detect an edge with a falling slope when the vision system scans an image from the first (smaller) circle with R1 to the second (larger) circle with R2. Since the direction of scan has also been switched, with the change of a to-be-detected edge slope from "Rising" to "Falling," the modified circle tool is also configured to detect and measure a bossed circular area similarly to the original circle tool before the modification. Once the editing is complete, the user selects "OK" in the second parameter editing window 329B, and the results of the modification are reflected in the "Circle Tool" node 355B.5 in the editing interface 300, as well as in the code instruction to be executed.

Figures 5I, 5J:
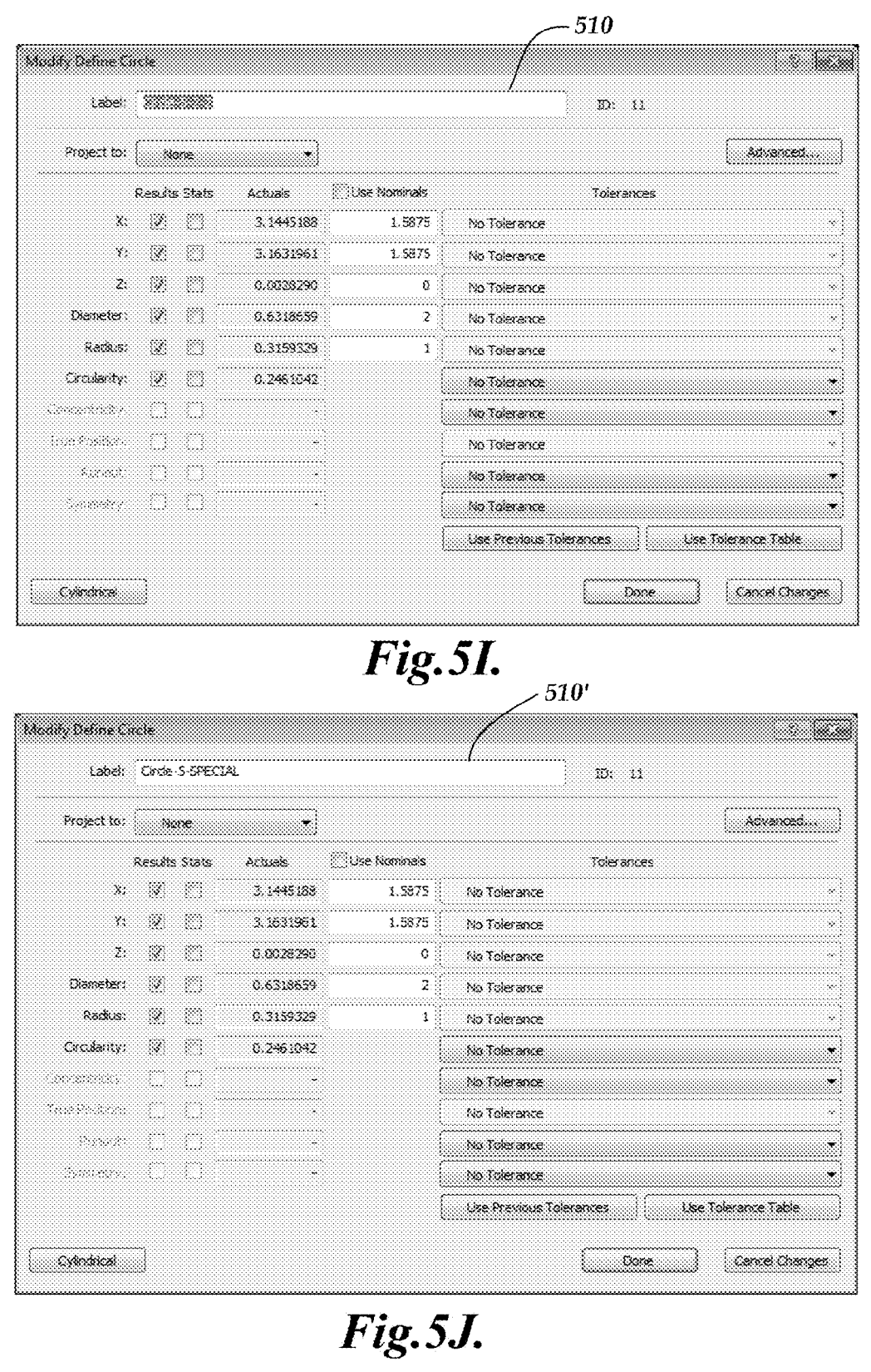

FIG. 5I shows the measurement results of the workpiece feature 415 at location [2,2] based on the "Surface Focus Tool" node 354.5X that has been added and the "Circle Tool" node 355B.5 that has been modified, as described above. In a label (name) window 510, the measured circle is identified as "Circle-5-2-2," meaning that the measured circle is the Circle-5 identified at location [2,2]. In some embodiments, the label (name) of a workpiece feature measured by a modified set of instruction representations (with a corresponding modified set of code instructions) may be changed, automatically, semi-automatically or manually, to be distinguishable from the label (name) of a workpiece feature measured by a non-modified set of instruction representations. FIG. 5J shows an implementation example in which the user has changed the label (name) of a measured workpiece feature from "Circle-5-2-2" to "Circle-5 SPECIAL" in the label (name) window 510'.

After completing modification of the "Circle Tool" node 355B.5 in the instance 354.5, the user may continue to edit (e.g., delete, add, and modify) any of the instruction representations in each of the instances, independently of other instances, in the editing interface 300, similarly to the various editing operations described herein above as examples. In accordance with various embodiments, user editing (e.g., deletion, addition, modification, etc.) of instruction representations may be intuitively, flexibly and robustly carried out in the editing interface 300, as visually assisted by multiple windows, drop down menus, tool bars, etc. that may be displayed at appropriate times to guide the user through the editing process. In various embodiments, the results of the editing are simultaneously reflected in real time in all of these various windows, menus, etc. in the editing interface 300, to further assist the user in the editing process. In various embodiments, any modification made to the instruction representations in the editing interface 300 may also effect, automatically or semi-automatically, the same modification to the corresponding code instructions to be executed. Throughout the editing process, each instance of the basic set of step-and-repeat instructions is maintained independently of each other in various embodiments, such that each instance is independently editable and any editing made in one instance is not reflected in other instances.

In various exemplary embodiments, as previously outlined, a part program including step-and-repeat instructions and/or the instructions generated by the step and repeat loop converter 173 is written in a markup-type language, such as Extensible Markup Language (XML) or a similar customized markup language. That is, the editable instruction representations displayed in the editing interface 300 point to corresponding code instructions (machine-executable instructions) written in a markup-type language.

FIG. 6A is a sample code written in a customized markup language, which corresponds to the "Array Step and Repeat Loop MyLoop" node 354 of FIGS. 3B and 3C before it is converted (or unrolled). In FIG. 6A, the code corresponding to each instruction representation (or node) on the editing interface 300 is indicated by the same reference numeral but with a suffix of M. For example, the code corresponding to the "Array Step and Repeat Loop MyLoop" node 354 is indicated by 354M, which includes the code 355M corresponding to the "Measure Circle Circle-5" node 355 in the repeated operations block and the code 356M corresponding to the "Measure Line Line-3" node 356 in the repeated operations block. The code 354M, 355M and 356M corresponding to the "Array Step and Repeat Loop MyLoop" node 354, "Measure Circle Circle-5" node 355 and "Measure Line Line-3" node 356 are expanded, as indicated by the "-" sign placed adjacent thereto as indicated by 354X, 355X and 356X, to thereby show the entire contents therein. The rest of the code corresponding to the rest of the editable instruction representations are all collapsed as indicated by the "+" sign placed adjacent thereto. It will be appreciated that, in one embodiment, the instruction representations 351-356 of FIGS. 3A-3E comprise icons and labels that are derived from the HTML-like or XML-like code instructions of FIG. 6A. The instruction representations 351-356 as displayed in the editing interface 300 are not themselves executed, but instead point to the associated code instructions of FIG. 6A that are executed.

As also shown in FIG. 6A, the XML-like code instructions include node I.D. numbers 390, which in one embodiment may respectively correspond to the instruction representations (nodes) as displayed in the editing interface 300 of FIGS. 3A-3E.

FIG. 6B is a sample code written in the customized markup language, which corresponds to the replacement code for the converted "Array Step and Repeat Loop MyLoop" node 354 after it is converted and eliminated by executing the "unroll" command as in FIG. 3E and after the replacement code is edited to correspond to the edited representations state shown in FIG. 3I, as will be more fully described below. Note that the StepArray code element 354M and the corresponding "End-Loop" and </StepArray> elements 357 shown in FIG. 6A have been eliminated in FIG. 6B. FIG. 6B shows various independently-editable blocks of code corresponding to the representations 354.1-354.6 shown in FIG. 3I. For example, 355[1.3.]M and 356[1.3.]M correspond to the Circle and Line elements, respectively, in 354.3. Similarly, 355[2.2]M corresponds to the Circle element in 354.5, which has been edited such that no Line element (e.g. an element 356) is included in that edited instance. Similarly 355[2.3]M and 356[2.3.]M correspond to the Circle and Line elements, respectively, in 354.6, and so on.

FIG. 6C is an expanded portion of the code instructions in the customized markup language corresponding to the edited code instance 355[2.2]M shown in FIG. 6B of instructions, which corresponds to the element 354.5 in FIG. 3I. As shown in FIG. 6C. The expanded code clearly shows the modified "Set Up For Measurement" node 354.5L with modified light setting in 610A to use the "coax" lighting at 15% intensity level (see FIGS. 3G and 3H). FIG. 6C also shows that the portion of the code instructions including the code (611A) corresponding to the "Surface Focus Tool" node 354.5X, which has been added to the modified instance 354.5 for location [2,2] (see FIG. 3I). FIG. 6C further shows that the code corresponding to the "Circle Tool" node 355B.5 as modified in FIG. 3I reflects the modification to use a "FALL- ING" edge slope instead of a "RISING" edge slope, as indicated by 612A. FIG. 6C still further shows that the portion of the code instructions includes the measurement results, which are actual data 614A obtained by running the modified instance 354.5 of instructions on a workpiece feature at location [2,2] to measure the circle at location [2,2], now labeled "Circle-5-SPECIAL (see FIG. 5J). Note that the change made to the name ("Circle-5-SPECIAL") in the label (name) window 510' of FIG. 5J is reflected in the feature label 613A of the actual data 614A in the code instructions.

As discussed above in reference to FIGS. 2A and 2B, execution of any portion of a part program including the unrolled step-and-repeat instructions may be carried out not only in the run mode according to a run mode of execution, wherein a part program is executed from the beginning, but also in the learn mode when the user is training the machine vision inspection system to learn how to acquire images and analyze/measure workpiece features in acquired images. As further described above, in various embodiments, any portion of the part program that is being generated or edited may be executed in the learn mode according to an edit mode of execution, which is different from the run mode of execution. Unlike the run mode of execution, the edit mode of execution may start at any mid-point in a part program, by using "surrogate data" which is typically an actual data previously acquired from executing the part program. In various embodiments, surrogate data from previously executed instructions in a part program may be used as a substitute for actually executing those instructions at a later time, for example to continue execution of later portions of the program to acquire actual data in a later portion of the part program. Thus, some or all of the actual data 614A obtained by running the modified instance 354.5 of the step-and-repeat instructions on a workpiece feature at location [2,2] may be used as such surrogate data in order to generate the right context for the purpose of editing and running, according to the edit mode or execution, any subsequent portion of the part program. Conversely, the right context for the purpose of editing an instance within the blocks of the converted instructions may be generated using surrogate data of previous portions of the part program preceding the to-be-edited instance of the converted instructions. That is, when a user selects any of the independently-editable instances of the converted instructions in the editing interface 300 to edit/modify, previously acquired data in connection with prior portions of the part program, or version of the data modified or formatted for compatibility, may be utilized as surrogate data for establishing a valid context for the selected edits.

FIG. 6D is an expanded portion of another of the code instructions in the customized markup language corresponding to the unedited code instance 355[2.3]M shown in FIG. 6B, which corresponds to the element 354.6 in FIG. 3I. The expanded code in FIG. 6D clearly shows the code corresponding to the unmodified "Set Up For Measurement" node of the unmodified instance 354.6, which defines use of the "stage" light at 27% intensity level, as indicated by 610B. (Cf. the "coax" light at 15% intensity level, as indicated by 610A in FIG. 6C). FIG. 6D also shows that the code instructions corresponding to the unmodified "Circle Tool" node of the unmodified instance 354.6 reflect use of a default "RISING" edge slope, as indicated by 612B. (Cf. the "FALLING" edge slope, as indicated by 612A in FIG. 6C). FIG. 6D still further shows that the portion of the code instructions corresponding to the unmodified instance 354.6 includes actual data 614B obtained as the measurement results of running the unmodified instance 354.6 of instructions on a workpiece feature at location [2,3]. The feature label 613B for the circle that is measured at location [2,3] is unmodified and reads "Circle "Circle-5-2-3." (Cf. the "Circle-5-SPECIAL," as indicated by 613A in FIG. 6C).

Comparison of FIGS. 6C and 6D makes it apparent that the code instructions for the modified instance of FIG. 6C are quite different from the code instructions for the unmodified instance of FIG. 6D, despite that the two instances were initially replicated from the same repeated operation block of a step and repeat loop at locations [2,2] and [2,3] within the step and repeat array. The comparison further shows how, according to various embodiments of the present invention, multiple instances of instructions obtained by converting a step-and-repeat programming element according to principles disclosed herein are independently editable such that any edits made to one instance are reflected in its corresponding code but are not reflected in the code corresponding to other instances. As discussed above in reference to FIG. 2A, in some embodiments, the translation between the instruction representations effected in the editing interface 300 and the machine-executable code instructions may be performed by the recorder translator 155 coupled to the controller 125.

Figure 7:
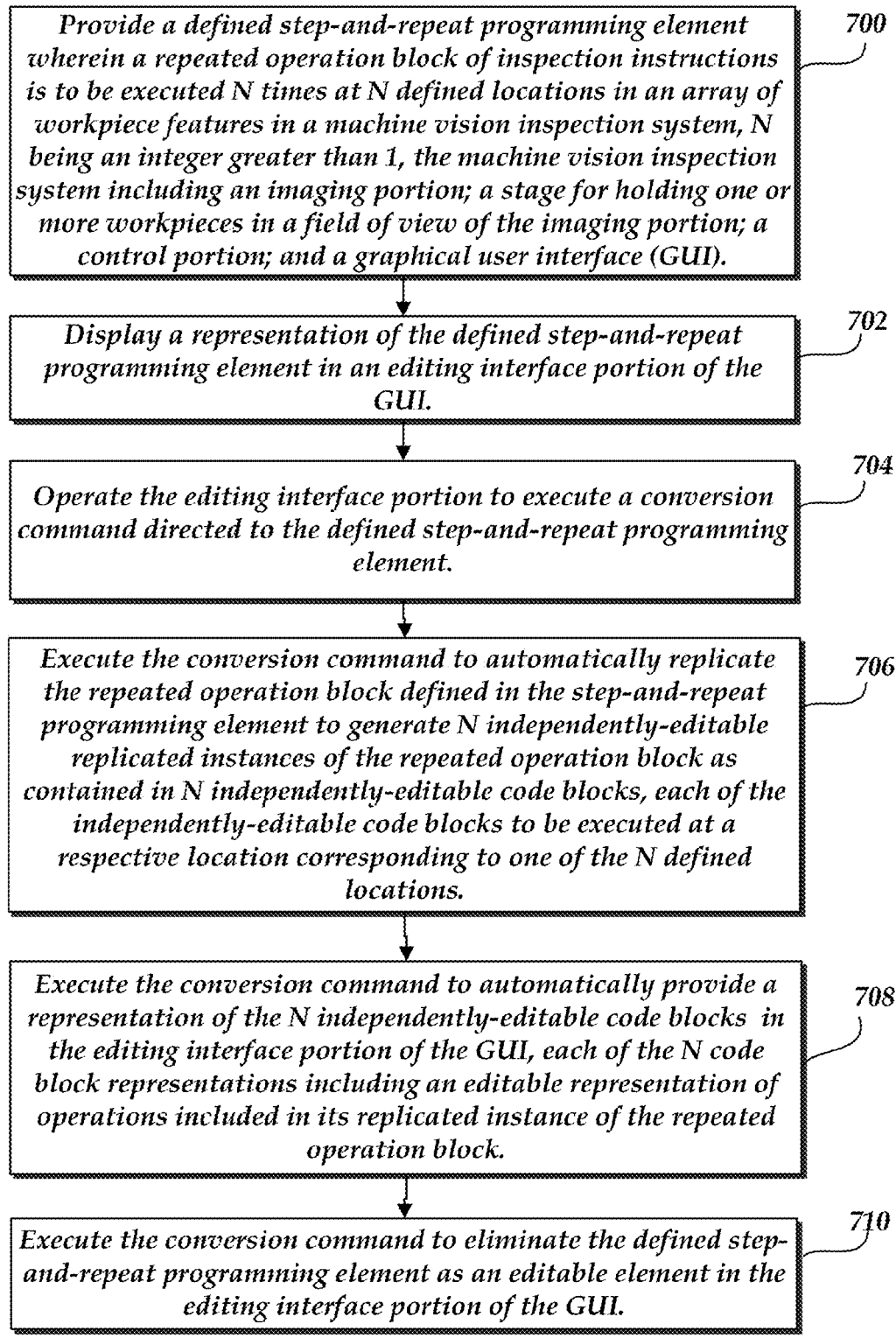
FIG. 7 is a flow diagram illustrating one example of a routine for converting a defined step-and-repeat programming element to generate independently-editable code blocks including independently-editable substantial replications of the inspection instructions defined in the repeated operation block of the step-and-repeat programming element, according to principles disclosed herein.

FIG. 7 is a flow diagram illustrating one example of a routine or method which may be performed by a computer for converting a defined step-and-repeat programming element to generate independently-editable code blocks including independently-editable substantial replications of the inspection instructions defined in the repeated operation block of the step-and-repeat programming element, according to principles disclosed herein.

The illustrated embodiment of the method includes generally six steps. Step 700 includes providing a defined step-and-repeat programming element wherein a repeated operation block of inspection instructions is to be executed N times at N defined locations in an array of workpiece features in a machine vision inspection system, N being an integer greater than 1, the machine vision inspection system including an imaging portion; a stage for holding one or more workpieces in a field of view of the imaging portion; a control portion; and a graphical user interface (GUI). Step 702 includes displaying a representation of the defined step-and-repeat programming element in an editing interface portion of the GUI (e.g. see FIG. 3C). Step 704 includes operating the editing interface portion to execute a conversion command directed to the defined step-and-repeat programming element (e.g. see FIG. 3D). Step 706 includes executing the conversion command to automatically replicate the repeated operation block defined in the step-and-repeat programming element to generate N independently-editable replicated instances of the repeated operation block as contained in N independently-editable code blocks, each of the independently-editable code blocks to be executed at a respective location corresponding to one of the N defined locations (e.g. see FIGS. 3E-3F). Step 708 includes executing the conversion command to automatically provide a representation of the N independently-editable code blocks in the editing interface portion of the GUI, each of the N code block representations including an editable representation of operations included in its replicated instance of the repeated operation block (e.g. see FIGS. 3E-3I). Step 710 includes executing the conversion command to eliminate the defined step-and-repeat programming element as an editable element in the editing interface portion of the GUI (e.g. see FIGS. 3E-3I).

It should be appreciated that although the step and repeat loop examples described above were arranged on an XY grid, a step and repeat loop may also be arranged on a circular grid. Thus, it will be appreciated that references to locations herein are not restricted to XY locations, but also apply to radial and angular locations or positions, as well as any other form of location reference which may be used in a step and repeat loop.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A machine vision inspection system comprising:
an imaging portion,
a stage for holding one or more workpieces in a field of view of the imaging portion,
graphical user interface (GUI), and
a control portion including:
a processor;
a memory coupled to the processor;
a run mode configured to be operable to execute a previously created part program to perform automatic imaging and/or inspection operations on workpiece(s), according to a run mode of execution;
a learn mode configured to be operable to receive user input to control operations of the machine vision inspection system and record associated part program instructions corresponding to the controlled operations in order to create a part program;
an editing portion operable to edit part program instructions in the learn mode, the editing portion including an editing interface portion displayable in the GUI;
a step and repeat loop generator configured to be operable to generate and define, in the learn mode, a step-and-repeat programming element in a part program, the defined step-and-repeat programming element defining a repeated operation block of inspection instructions to be executed N times at N defined locations in an array of workpiece features in the machine vision inspection system, N being an integer greater than 1; and
a step and repeat loop converter configured to be operable to provide step and repeat conversion operations directed to a defined step-and-repeat programming element, wherein the conversion operations comprise:
automatically replicating the inspection instructions defined in the repeated operation block of the defined step-and-repeat programming element to generate N independently-editable code blocks each including an independently-editable substantial replication of the inspection instructions defined in the repeated operation block, each of the independently-editable code blocks to be executed at a respective location corresponding to one of the N defined locations,
automatically providing a representation of the N independently-editable code blocks in the editing interface portion of the GUI, each of the N code block representations including an editable representation of operations included in its replicated instance of the repeated operation block, and
eliminating the defined step-and-repeat programming element as an editable element in the editing interface portion of the GUI.

2. The system of claim 1, wherein
generating the N independently-editable code blocks includes generating, for each independently-editable code block, independently-editable instructions that determine the respective location where that independently-editable code block is to be executed.

3. The system of claim 1, wherein the N independently-editable code blocks comprise machine-executable code instructions written in a markup language and editable instruction representations that are displayed on the GUI and that are associated with their corresponding code instructions.

4. The system of claim 1, further comprising a step and repeat conversion command displayable in the GUI, the conversion command selectable by a user to activate the step and repeat loop converter to provide the step and repeat conversion operations directed to the defined step-and-repeat programming element.

5. A non-transitory computer-readable medium including computer-executable instructions, which are configured to be loaded onto a computer to enable the computer to perform a method for generating N independently-editable instances of a repeated operation block of inspection operations defined in a step-and-repeat programming element wherein the repeated operation block is to be executed N times at N locations in an array of workpiece features in a machine vision inspection system, N being an integer greater than 1, the machine vision inspection system including an imaging portion; a stage for holding one or more workpieces in a field of view of the imaging portion; a control portion; and a graphical user interface (GUI), the method to be performed comprising:
displaying a representation of the defined step-and-repeat programming element in an editing interface portion of the GUI,
operating the editing interface portion to execute a conversion command directed to the defined step-and-repeat programming element, wherein the conversion command includes operations comprising:
automatically replicating the inspection instructions defined in the repeated operation block defined in the step-and-repeat programming element to generate N independently-editable code blocks each including an independently-editable substantial replication of the inspection instructions defined in the repeated operation block, each of the independently-editable code blocks to be executed at a respective location corresponding to one of the N defined locations,
automatically providing a representation of the N independently-editable code blocks in the editing interface portion of the GUI, each of the N code block representations including an editable representation of the inspection instructions included in its replicated instance of the repeated operation block, and
eliminating the defined step-and-repeat programming element as an editable element in the editing interface portion of the GUI.

6. The medium of claim 5, wherein eliminating the defined step-and-repeat programming element as an editable element comprises deleting the displayed representation of the defined step-and-repeat programming element from the editing interface portion.

7. The medium of claim 5, wherein generating the N independently-editable code blocks includes generating independently-editable instructions for each independently-editable code block that determine the respective location where that independently-editable code block is to be executed.

8. The medium of claim 7, wherein for at least one of the independently-editable code blocks, the independently-editable instructions that determine the respective location where that independently-editable code block is to be executed include motion control instructions.

9. The medium of claim 5, wherein the method further comprises providing the defined step-and-repeat programming element by one of a) operating the GUI to create the step-and-repeat programming element and define its repeated operation block and its parameters that define the N locations, and b) opening a previously created part program including the defined step-and-repeat programming element and displaying a representation of the previously created part program in the editing interface portion of the GUI.

10. The medium of claim 5, wherein the method further comprises providing, via the GUI, user editing input to edit one of the independently-editable code blocks, and recording the resulting independently-editable code block in a part program as edited.

11. The medium of claim 10, wherein the user editing input comprises one or more of adding an instruction, deleting an instruction, and modifying an instruction in that one of the independently-editable code blocks.

12. The medium of claim 10, wherein the user editing input comprises deleting that one of the independently-editable code blocks.

13. The medium of claim 10, wherein the user editing input to edit that one of the independently-editable code blocks does not affect the other independently-editable code blocks.

14. The medium of claim 5, wherein operating the editing interface portion to execute the conversion command directed to the defined step-and-repeat programming element comprises:
   selecting the representation of the defined step-and-repeat programming element in the editing interface portion of the GUI;
   operating the GUI to display a menu including editing commands corresponding to the selected representation of the defined step-and-repeat programming element; and
   selecting the conversion command in the displayed menu.

15. The medium of claim 5, wherein generating the N independently-editable code blocks includes generating at least one of a unique node identifier and a unique code block name for each of the independently-editable code blocks.

16. The medium of claim 5, wherein the N independently-editable code blocks comprise machine-executable code instructions written in a markup language and editable instruction representations that are displayed on the GUI and that are associated with their corresponding code instructions.

17. The medium of claim 5, wherein each of the N code block representations including an editable representation includes at least one of a node, a parent node, and a child node.

\* \* \* \* \*